United States Patent [19]

Sassover et al.

[11] 4,383,242

[45] May 10, 1983

[54] AUTOMOBILE ANTI-THEFT SYSTEM

[75] Inventors: Nathan Sassover, Beverly Hills; William A. Rennie, Redondo Beach, both of Calif.

[73] Assignee: TMX Systems Limited, Lisburn, Ireland

[21] Appl. No.: 45,119

[22] Filed: Jun. 4, 1979

[51] Int. Cl.³ .................. B60R 25/04; G08B 13/08
[52] U.S. Cl. ........................... 340/64; 180/287; 307/10 AT; 340/539; 340/543; 340/825.32; 361/172
[58] Field of Search ............... 340/64, 147 MD, 542, 340/543, 63, 539, 825.31, 825.32; 307/10 AT; 361/171, 172; 180/287; 325/37, 55; 455/28, 31, 70

[56] References Cited

U.S. PATENT DOCUMENTS

| | | | |
|---|---|---|---|
| 3,614,734 | 10/1971 | Davis | 340/63 X |
| 3,703,714 | 11/1972 | Andrews | 340/64 X |
| 3,833,895 | 9/1974 | Fecteau | 325/55 X |
| 3,845,361 | 10/1974 | Watase et al. | 340/147 MD X |
| 3,858,175 | 12/1974 | Kopera, Jr. | 307/10 AT X |
| 3,930,226 | 12/1975 | Plumberg | 307/10 AT X |
| 3,956,732 | 5/1976 | Teich | 180/287 X |
| 3,987,408 | 10/1976 | Sassover et al. | 307/10 AT X |
| 4,067,411 | 1/1978 | Conley et al. | 307/10 AT X |
| 4,101,873 | 7/1978 | Anderson et al. | 340/539 |
| 4,104,694 | 8/1978 | Hargrove | 340/825.31 X |
| 4,141,010 | 2/1979 | Umpleby et al. | 325/55 X |
| 4,143,368 | 3/1979 | Route et al. | 340/543 |
| 4,159,467 | 6/1979 | Ballin | 340/64 |
| 4,258,352 | 3/1981 | Lipschutz | 340/53 |

Primary Examiner—John W. Caldwell, Sr.
Assistant Examiner—Joseph E. Nowicki
Attorney, Agent, or Firm—Michael I. Rackman; George Gottlieb; James Reisman

[57] ABSTRACT

An anti-theft system which is armed only when a hand-held coded transmitter is operated; the system is disarmed upon a subsequent operation of the transmitter. Whenever the transmitter is operated, the horn beeps, and the lights flash; this provides both verification that the system is armed, and serves as a car-locating aid in a parking field. Tampering with the automobile results in intermittent beeping of the horn and flashing of the lights. The horn beeping may be disabled during the verification and car locating sequences, while still operating if unauthorized access to the automobile is attempted. Other features include disabling of the horn beeping by momentarily turning on the ignition; beeping of the horn after the system is disarmed and a door is opened by the operator if, during his absence, unauthorized access was attempted; locking and unlocking of the doors with transmitter operation; and detection of unauthorized access attempts by sensing vibrations in the vehicle radio loudspeakers.

75 Claims, 16 Drawing Figures

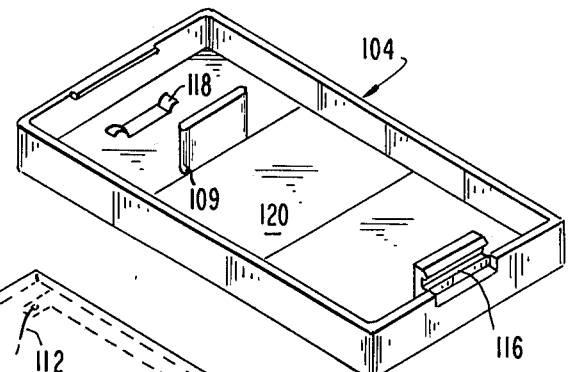
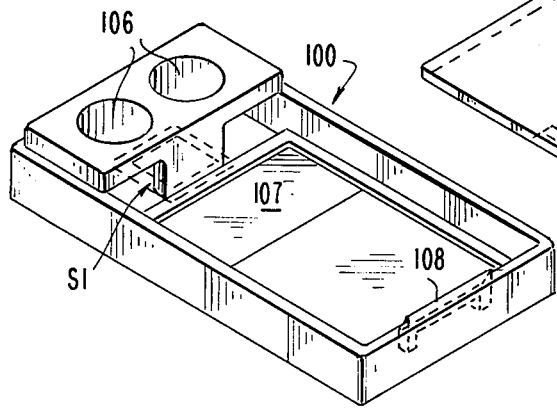
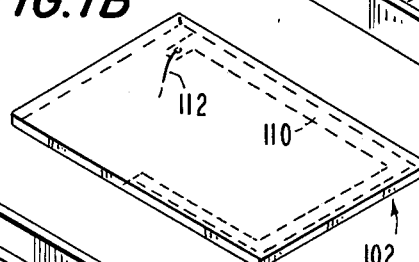
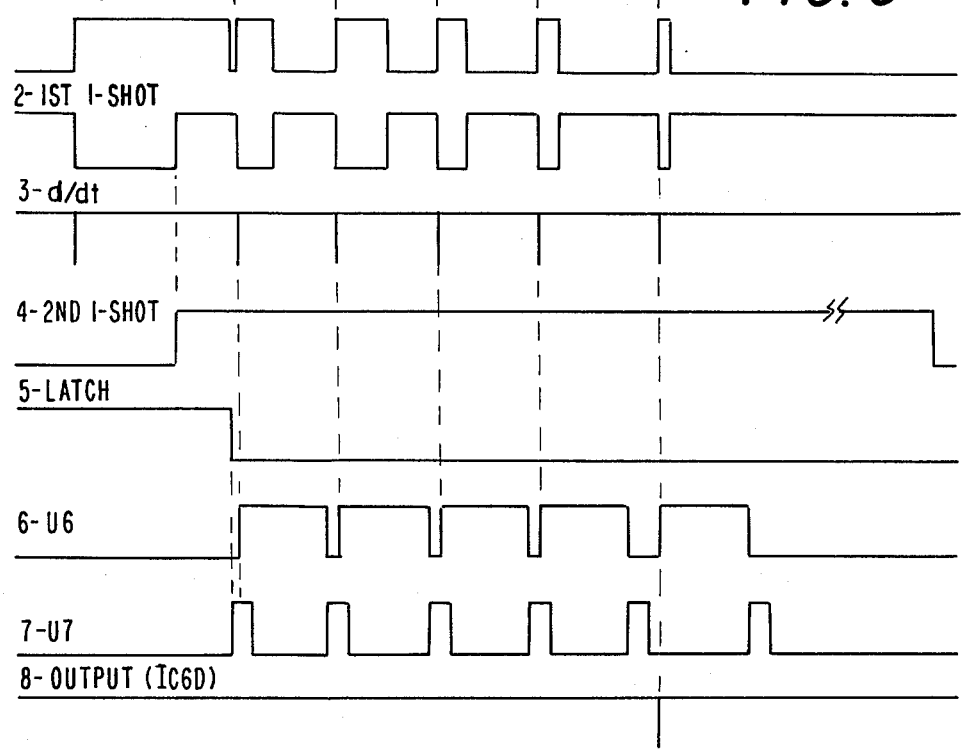

AUTOMOBILE ANTI-THEFT SYSTEM

This invention relates to vehicle anti-theft systems, and more particularly to automobile anti-theft systems.

An improved vehicle anti-theft system is disclosed in Sassover et al U.S. Pat. No. 3,987,408, issued on Oct. 19, 1976. In the Sassover et al system, a receiver is mounted in the trunk of the automobile. The receiver is connected to the electrical system of the automobile, and when the system is "armed" the ignition system is disabled from operating. In order to operate the vehicle, a hand-held transmitter is operated at the same time that the vehicle's ignition is turned on; the receiver recognizes a coded signal and inhibits further disablement of the ignition system. The system is armed automatically whenever the ignition is turned off. A key-operated switch on the receiver is provided to allow the driver to de-activate the system when that is desired, for example, when the car is parked in a public garage.

It would appear that the automatic arming feature is a desirable one in that no action is required on the part of the operator to arm the system; the security controls are put into effect automatically when the ignition system is turned off. However, the automatic arming feature also has a disadvantage, and it has been discovered that this disadvantage outweighs the advantage in many cases. There are many times when an operator does not want to arm the system, for example, if he remains nearby the automobile and does not wish to be bothered by having to operate the transmitter in order to enable the ignition system when he returns to the vehicle. Moreover, although the Sassover et al system was not equipped with a siren or some other device for sounding an alarm in response to an attempt being made to gain unauthorized access to the vehicle, it is apparent that should such a feature be added to the Sassover et al type system, the automatic arming could pose a problem. The driver must be given time to leave the vehicle before the alarm system is enabled. Otherwise, when he opens the door in order to exit the vehicle, the alarm will be triggered. It is standard practice, therefore, in the case of vehicles having alarm systems which are automatically armed, to delay the arming of the system for a short time period after the ignition is turned off, for example, thirty seconds. Conversely, a second delay of perhaps 15 seconds, is required to allow the authorized operator to re-enter the vehicle upon his return and disarm the system. The problem with this approach is that a trained car thief can foil the system even before the short delay has elapsed.

These problems are solved in accordance with the principles of our invention by requiring operation of the transmitter not only to disarm the system upon returning to the car, but also to arm it after leaving; as soon as the driver shuts the door, he may operate the transmitter to immediately arm the system. This will foil an attempt by any thief to enter the car after the driver has left and before the arming-delay interval has expired. The prior art alternative to accomplish the same objective is to provide a key-operated switch on the outside of the vehicle itself, and it is certainly far easier to push a transmitter button in one's pocket than it is to take out and use a key for arming the system as is customary practice, not to mention that such a key switch is vulnerable to expert assault.

But there is one disadvantage with this approach and it relates to a natural suspicion which many people may have as to whether the transmitter "worked"; did the system really arm itself when the transmitter was operated? Toward this end, we provide an automatic verification feature. In the illustrative embodiment of the invention, when the system is first armed, the lights (preferably the parking lights) flash and the horn beeps twice. Thus the driver receives both visible and audible verification that the system has been armed.

The horn-beeping verification is better than the flashing-light verification in that it does not require the driver to go to the front or rear of the car to see whether the lights flash. However, there are times when horn-beeping is not desired, for example, when a driver returns home late at night and does not wish to disturb those people who may be sleeping. For this reason, we provide a mechanism by which the horn-beeping verification may be disabled, leaving just the flashing-light verification. In its simplest form, a switch may be provided on the receiver which, when operated, prevents horn-beeping verification. Of course, this would require that the driver first open the trunk, where the receiver is usually mounted, to gain access to and operate the switch. In a more sophisticated embodiment of the invention, the horn-beeping verification may be disabled simply by use of the ignition switch. Whenever the ignition switch is turned on and then turned off in less than two seconds, there will be no subsequent horn-beeping verification. The horn-beeping verification procedure is enabled once again automatically when the ignition is next turned on and left on for more than two seconds. Thus, when arriving home late at night, the driver first shuts off the ignition and then turns it on for less than two seconds. When he then leaves the car and operates the transmitter, only the lights will flash. When he starts the car the next morning after silently disarming the system, the horn-beeping verification feature is automatically enabled once again.

This use of the ignition switch to modify the mode in which the overall anti-theft system operates is not limited to disabling horn-beeping verification. It is a general technique which may be used to modify any aspect of the system operation without requiring physical access to the receiver, and the applicability of the technique to horn-beeping verification is just one example of a variety of uses of the feature.

Once the system is armed, it does more than just inhibit the ignition system from operating. An attempt to gain access to the vehicle results in intermittent beeping of the horn. As in the prior art systems which control horn beeping to scare off a potential thief, the beeping does not persist indefinitely. In the illustrative embodiment of the invention, the horn beeps for only about forty-five seconds, a time sufficient to scare off a thief. The system then automatically re-arms itself so that another unauthorized access attempt, including that of a thief who was not scared off, results in another horn-beeping sequence.

In the event the horn-beeping verification was disabled, it has no effect on the beeping of the horn if there is an unauthorized access attempt. There is no way to disable the beeping of a horn triggered by a thief, even an inadvertent disabling, because in the illustrative embodiment of the invention this is one of the most important reasons for providing the anti-theft system in the first place. (In general, an "anti-theft" system which is armed and disarmed in accordance with the principles of our invention may operate in a variety of ways; for example, it may control ignition disablement, a thief-triggered alarm, both of these, or even some other anti-theft procedure.)

The transmitter-controlled arming of the system also controls the locking of the doors. This further guards against car theft. (If the horn-beeping verification has been disabled, the locking of the doors actually provides an audible and visible verification that the system has been armed.)

Devices known as "car locators" have been marketed in the past. Such a device allows a driver returning to his car to operate a transmitter, following which the lights on his car flash and the horn beeps. This allows a driver to locate his car in a crowded parking lot, for example. Such car locators have not enjoyed widespread use primarily because consumers are not willing to pay for the cost of a system which includes a transmitter and a receiver for this feature alone. However, the anti-theft system of our invention already includes the basic components of a car locator, and for this reason the provision of the feature in an overall anti-theft system is economically attractive. When using the system of our invention, the driver returns to his car and once again operates the transmitter. (This is to be distinguished from the Sassover et al system in which disarming occurs only if the transmitter is operated while the ignition switch is turned on.) This results in disarming of the anti-theft system, automatic unlocking of the door locks, flashing of the lights and a beep of the horn in order to assist the driver in locating his car. In many cases, it will not be necessary to "locate" the car, but the audible and visible response reassures the user that the system is, in fact, disarmed. The horn beep may be disabled just as it can be during arming verification—the momentary turning on of the ignition switch after it is first turned off prevents horn beeping both during the next transmitter operation which arms the system, and the subsequent transmitter operation which disarms it.

When the car is to be "located" and the system is to be disarmed, the horn beeps only once, but the lights continue to flash indefinitely since it cannot be determined in advance how long it will take the driver to actually locate his car. The flashing lights turn off, however, as soon as the operator turns on the ignition.

There is one potential problem which has also been anticipated. Suppose that the driver returns home in the evening, leaves the car, and operates the transmitter in order to arm the system in the usual manner, but then as he enters his house accidentally operates the transmitter once again. If the horn-beep feature has not been disabled, the driver will hear two horn beeps when he arms the system, and he will hear a third when he accidentally disarms it. He can then arm it once again. But if the horn beep has been disabled, and the driver does not see the flashing lights when he accidentally operates the transmitter a second time (the vehicle thus becoming disarmed and flashing its lights in order to help the driver locate the car), the lights will continue to flash all night, and the driver may find a dead battery in the morning. For this reason, when the system is disarmed, the car-locating flashing lights may persist for only about four minutes, following which they then automatically turn off. While the system may remain disarmed overnight, at least the battery will remain intact.

Present-day anti-theft/alarm systems have no way of informing the driver whether during his absence an attempt was made to gain unauthorized access to the car. For example, suppose that a thief did enter the car and steal something; it would at least be desirable to alert the driver to this fact so that he could make an immediate search for damage or for a missing article which might otherwise not be discovered until much later. Our system alerts the driver to a past triggering of the alarm-sounding horn during his absence. If the system has been armed, the vehicle then disturbed, and the system finally disarmed upon return of the driver, then when the driver opens the door, the horn will automatically sound for a fraction of a second. Thus if the driver hears the horn beep when he opens a door, he is in effect told that an attempt—successful or unsuccessful—was made to gain access to the car during his absence.

Most prior art anti-theft/alarm systems are triggered by the opening of a door. In general, the system of our invention has two inputs, one for detecting an alarm situation whenever any terminal which should remain grounded has battery potential applied to it, and one for detecting an alarm situation whenever any terminal which should exhibit the battery potential is grounded. By connecting these two terminals to various sensors in the vehicle as in the prior art (for example, to normally grounded or high-potential switches in the trunk or under the hood), any tampering of interest can be detected. In one prior art system (the SA 100 Sonic Alarm of TEST Incorporated), there was a more sophisticated sensing mechanism, one which involved use of one of the existing radio speakers in the vehicle. If a car is vibrated for any reason, for example, by the opening and especially the shutting of a door, a conventional car speaker acts as a microphone and generates a small signal across its input terminals. In the prior art, this signal was detected and triggered the beeping of the horn. We also utilize this type of feature. However, in the prior art, an alarm condition was detected by sensing the signal across a single speaker. Since most vehicles now contain stereo systems with at least two speakers, such an approach tends to make one side of the vehicle more sensitive to intrusions than the other. If the detecting mechanism is adjusted to "hear" an intrusion on the non-speaker side of the car, the speaker side of the car is then extra-ordinarily sensitive and may cause false alarms. For this reason, the system of our invention utilizes two speakers of a typical stereo system, each of which is typically located on a different side of the car. The signals developed by the two speakers are mixed and thus it is the average signal which is sensed. If one speaker generates a much larger signal than the other, the overall signal will be somewhere in between, approximating an average. Thus it does not matter which side of the car vibrates more or where a sound originates; the sensitivity of the sensing mechanism may be adjusted by experimenting, for example, with the slamming of any door.

The use of the car speakers to detect an intrusion does pose one problem, however. It will be recalled that if the horn-beeping is not disabled when the system is first armed, the horn beeps twice. This sound, in and of itself, may trigger the alarm (continued horn beeping for forty-five seconds) since the car speakers may respond to it. For this reason, when the system is first armed by operation of the transmitter, the verification signal actually precedes the arming. The horn beeps twice and the lights flash, and only after the horn ceases to beep does the system arm itself. The delay is only momentary but it is advisable to provide it so that the alarm is not accidentally triggered by the verification sequence.

The system includes other features such as preventing any recognition of a transmitted coded signal while the ignition is on (in order to prevent an accidental operation of the transmitter, while the driver is driving the car, from disabling the ignition system). In general, further objects, features and advantages of our invention will become apparent upon consideration of the following detailed description in conjunction with the drawing, in which:

FIGS. 1A-1C depict the three parts of the transmitter unit;

FIG. 6 is a series of waveforms which will be helpful in understanding the operation of the receiver;

Figure 7:
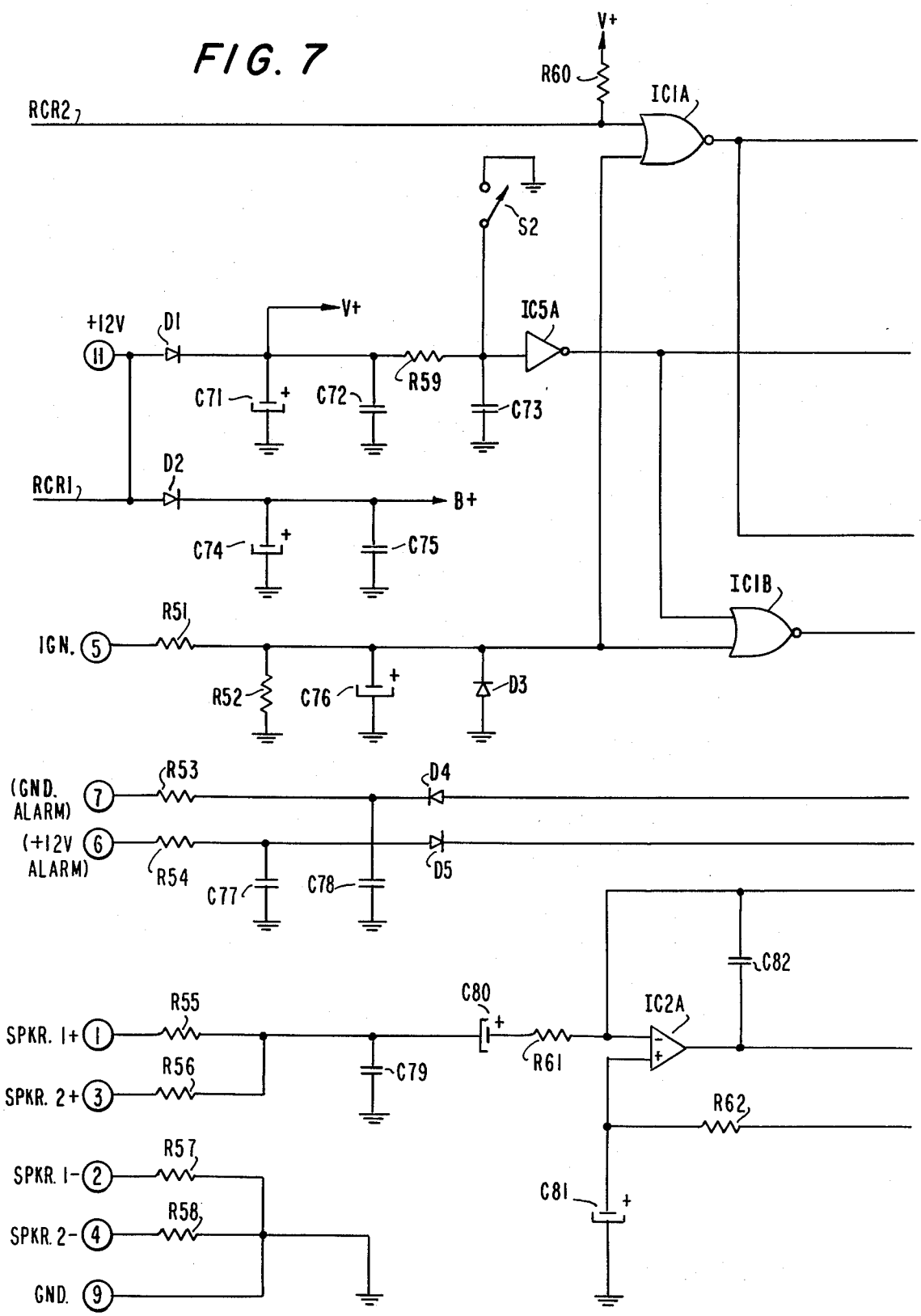
FIGS. 7-9 depict the logic section of the receiver/-logic unit which controls the various functions described above.
Figure 8:
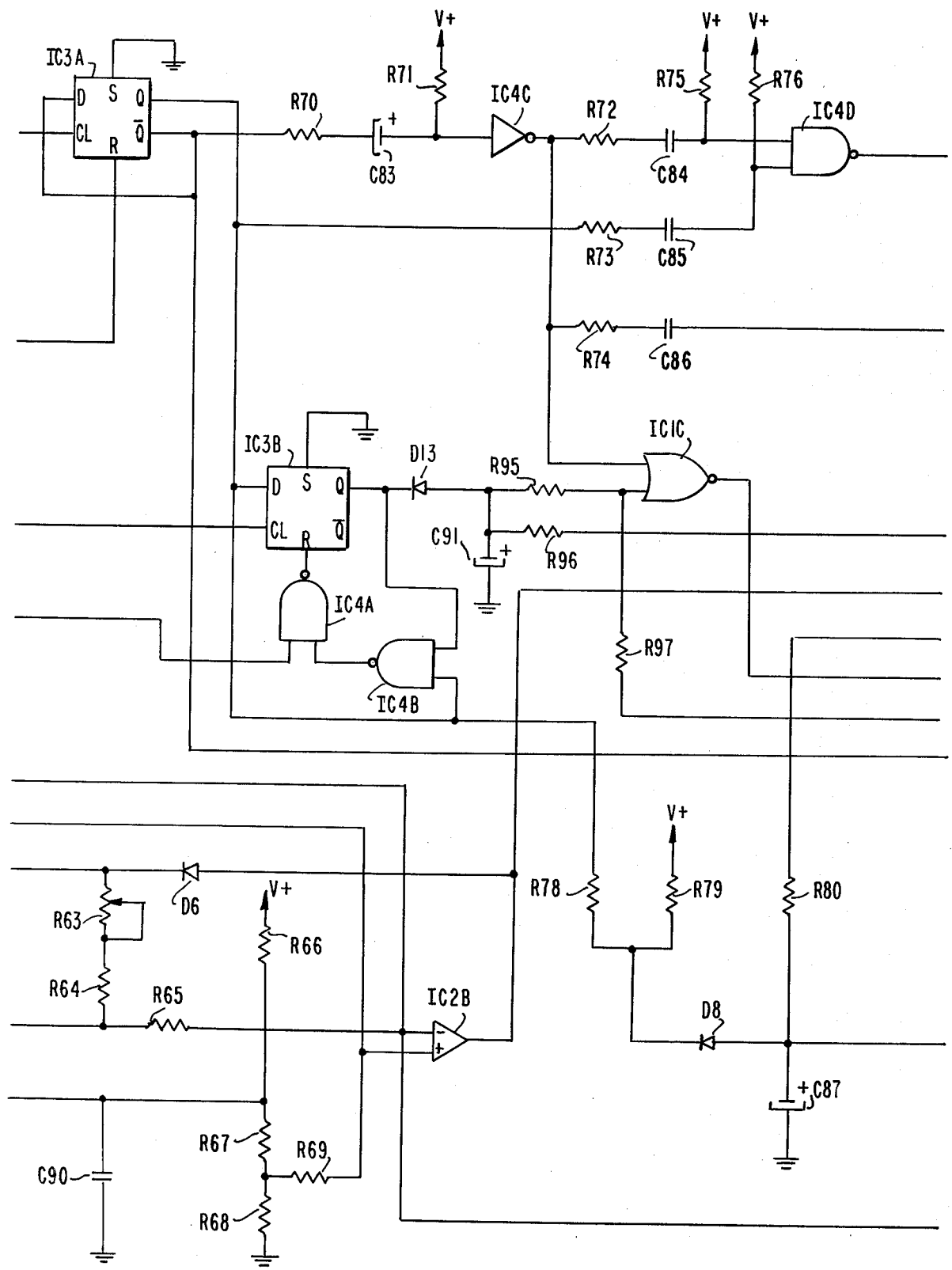
Figure 9:
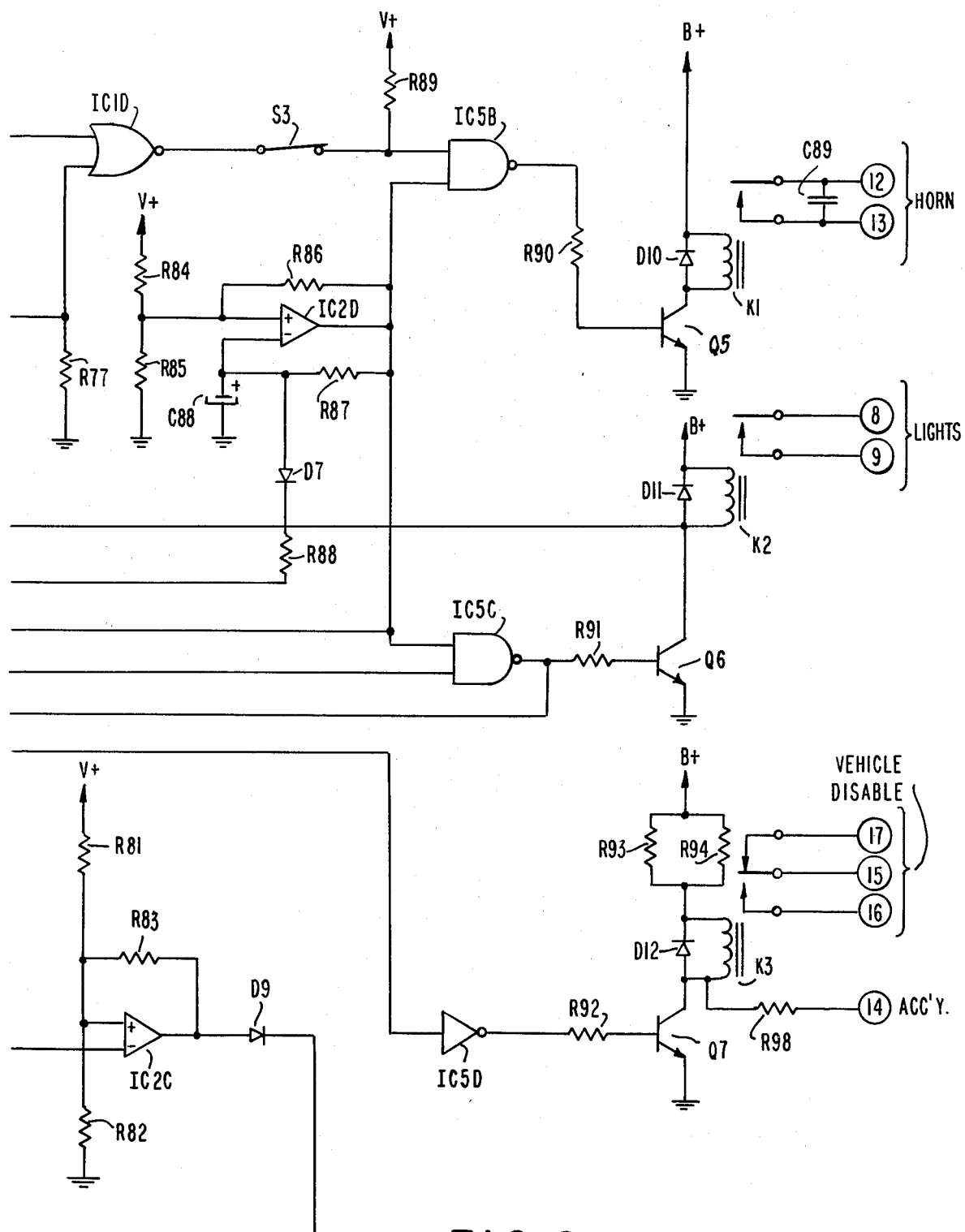
Figure 11:
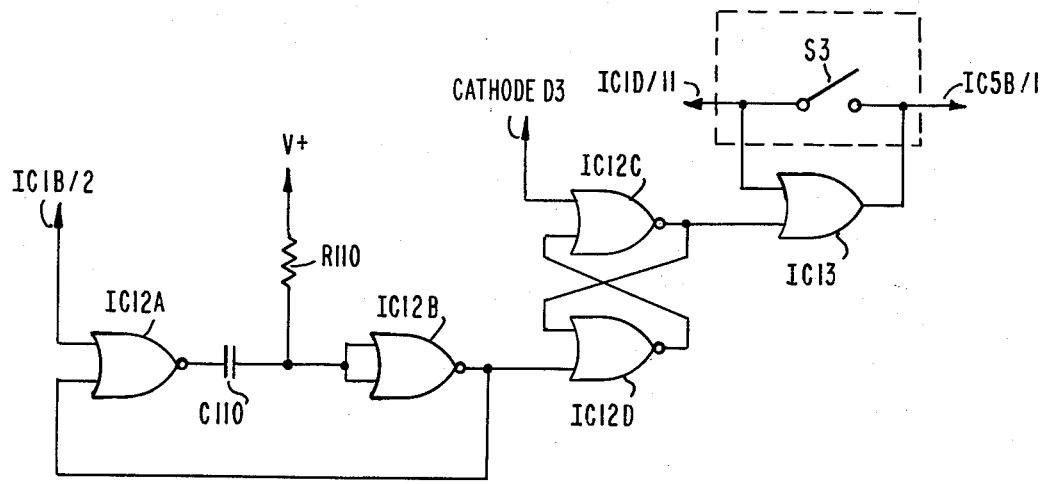
FIG. 11 is the schematic of another "add-on" circuit for FIGS. 7-9 which allows the horn-beeping to be disabled under control of the ignition switch.
Figure 12:
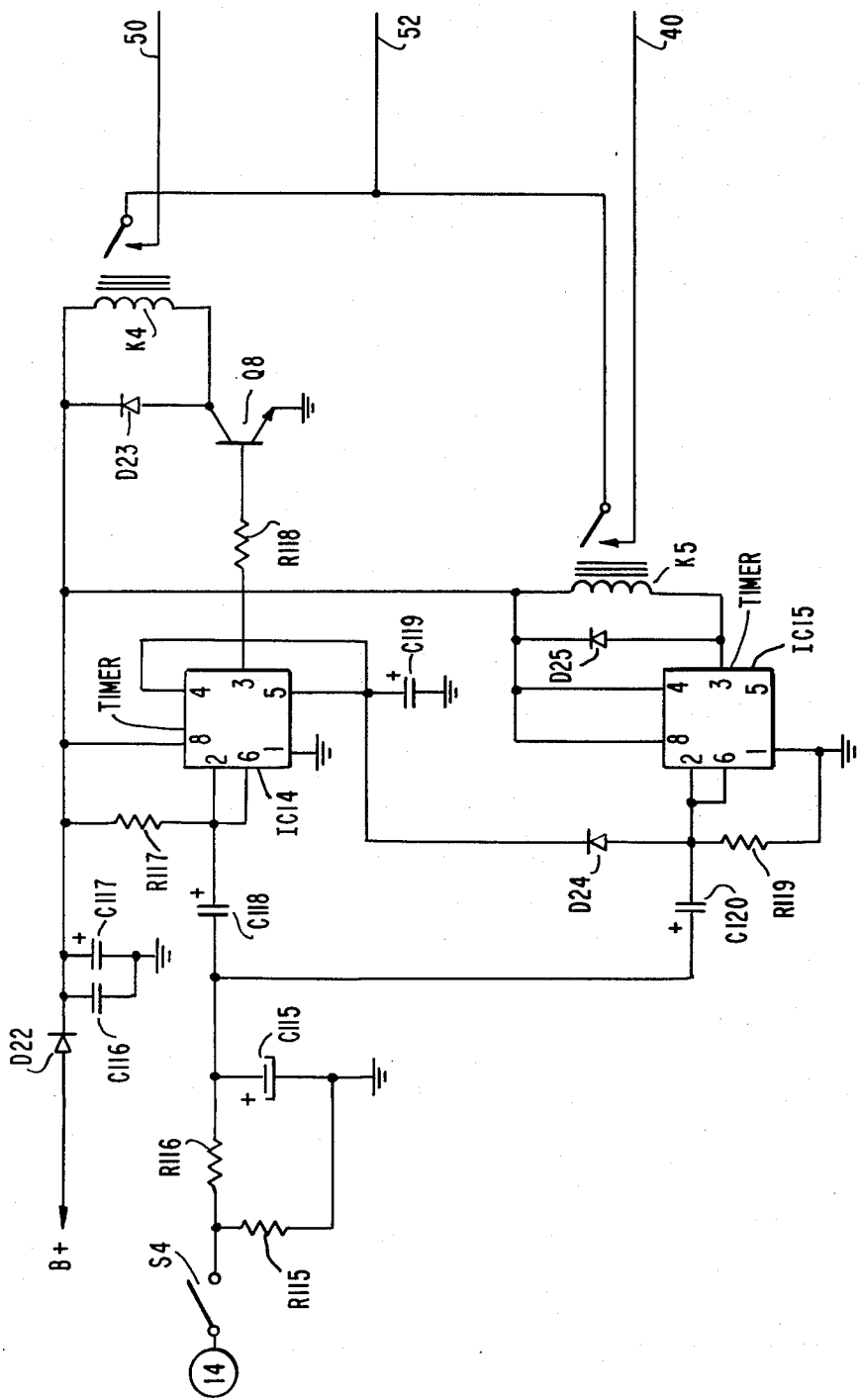
Figure 13:
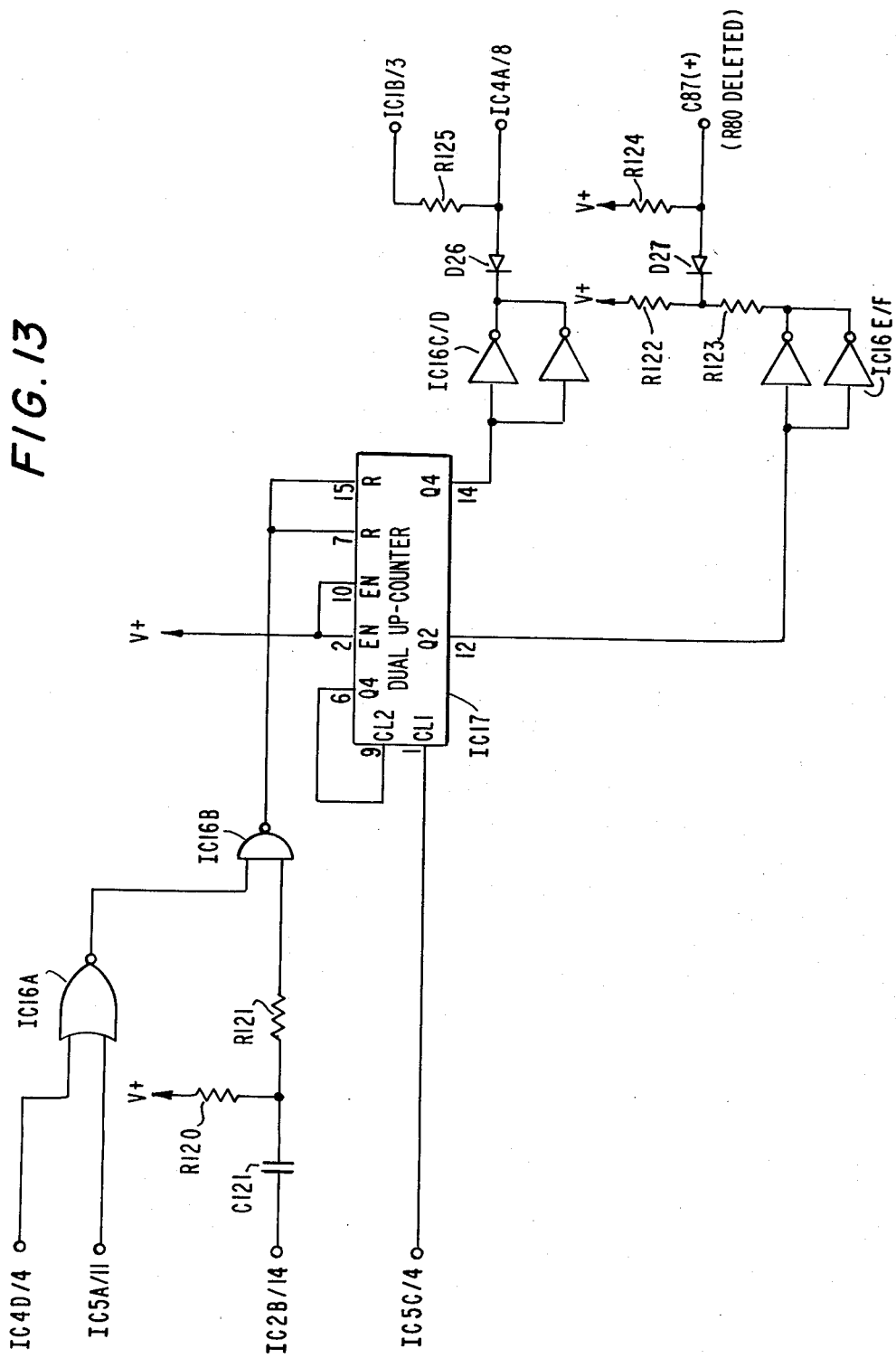

FIG. 12 is the schematic of another "add-on" circuit for FIGS. 7-9 which controls locking and unlocking of the door locks during the arming and disarming procedures; and FIG. 13 is the schematic of still another "add-on" circuit for FIGS. 7-9 which stops flashing of the lights following disarming of the system after four minutes have elapsed. (The circuits of FIGS. 10-13 are shown in "add-on" form in order not to complicate the basic schematic drawing of FIGS. 7-9, and also in the event that these additional features are not actually incorporated in the basic system in order to reduce costs.)

Although any form of code transmission may be utilized, pulse-width modulation is preferred primarily because paired integrated circuits are available for both the transmitter and receiver. The transmitter (FIG. 1) utilizes as chip U1 the TMX 2141 encoder, while the receiver (FIG. 3) utilizes for chip U3 the TMX 2151 decoder. Both devices are available from the assignee of this application, TMX Inc., 1100 Glendon Avenue, Los Angeles, Calif. These chips not only allow a tremendous number of possible codes, but they also enable the construction of a transmitter of very small size.

Figure 1:
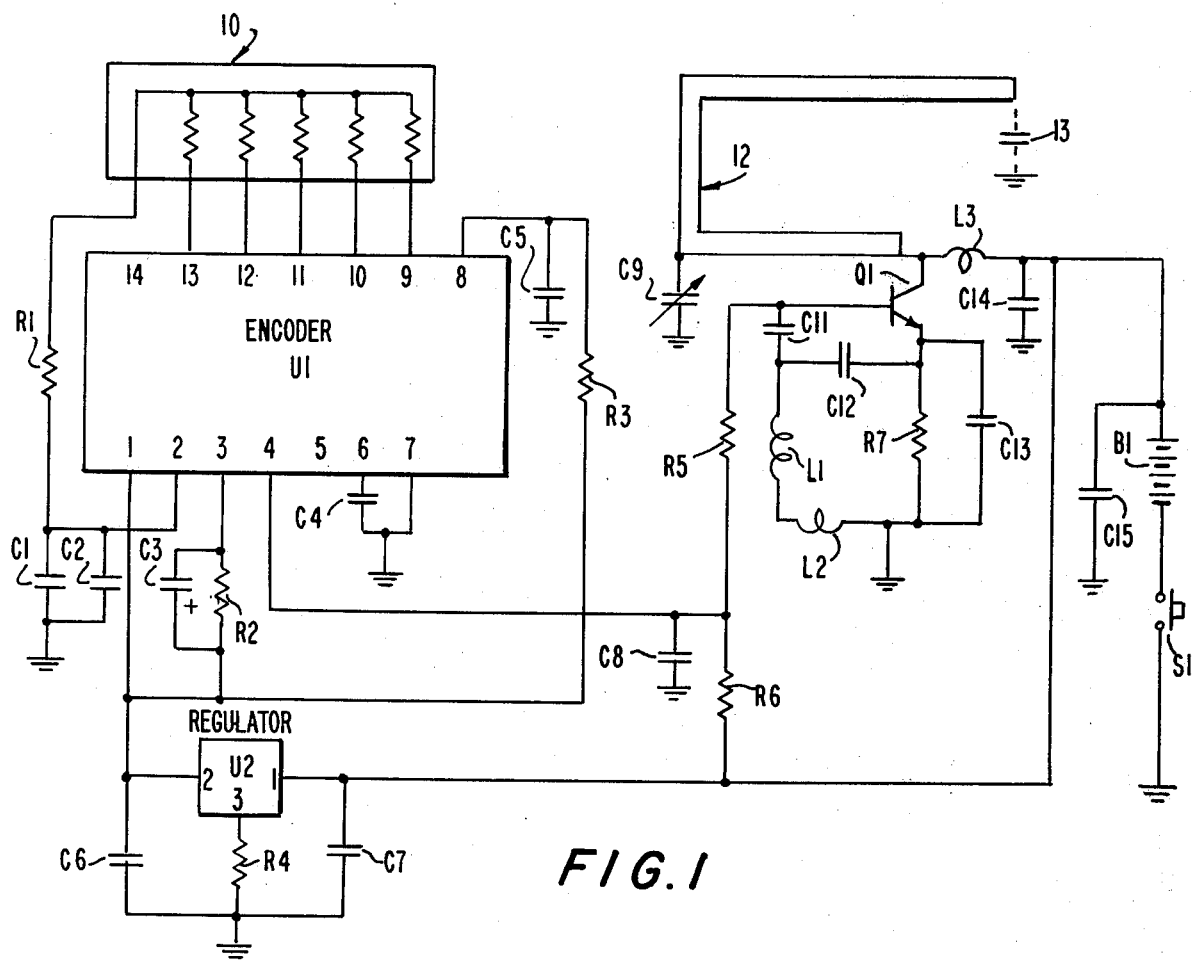
FIG. 1 is a schematic of the transmitter unit.

The transmitter is provided with a single push button switch S1 (FIG. 1). When this button is operated, a start pulse is transmitted for approximately 130 milliseconds. This pulse is not actually part of the code, but simply "informs" the receiver that a five-pulse code will follow. After transmission of the start pulse, the transmitter transmits five code pulses in rapid succession, 80 milliseconds apart. Each of the code pulses can vary in width from approximately 4 milliseconds to approximately 55 milliseconds depending upon the value of an external resistor provided for each pulse. If each resistor can assume one of 25 values, the total number of codes is $25^5$ or slightly below 10,000,000. If each transmitter/receiver pair can be operated on one of 14 possible RF channels (340 MHz in the illustrative embodiment of the invention), it is apparent that the total number of codes will be just under 140,000,000, a number more than adequate for security purposes.

The 80-millisecond pulse rate is preferred for the following reasons. If the clock period is too short, the code pulses will also be short and the system will be more susceptible to noise. On the other hand, if the clock period is made too long, the operator may have to wait for too long a period of time before there is any response following pushing of the transmitter button. The 80-millisecond clock period provides a compromise between these two extremes. The entire code may therefore be transmitted in approximately one-half second. Button S1 on FIG. 1 must be held down for this length of time.

Figure 3:
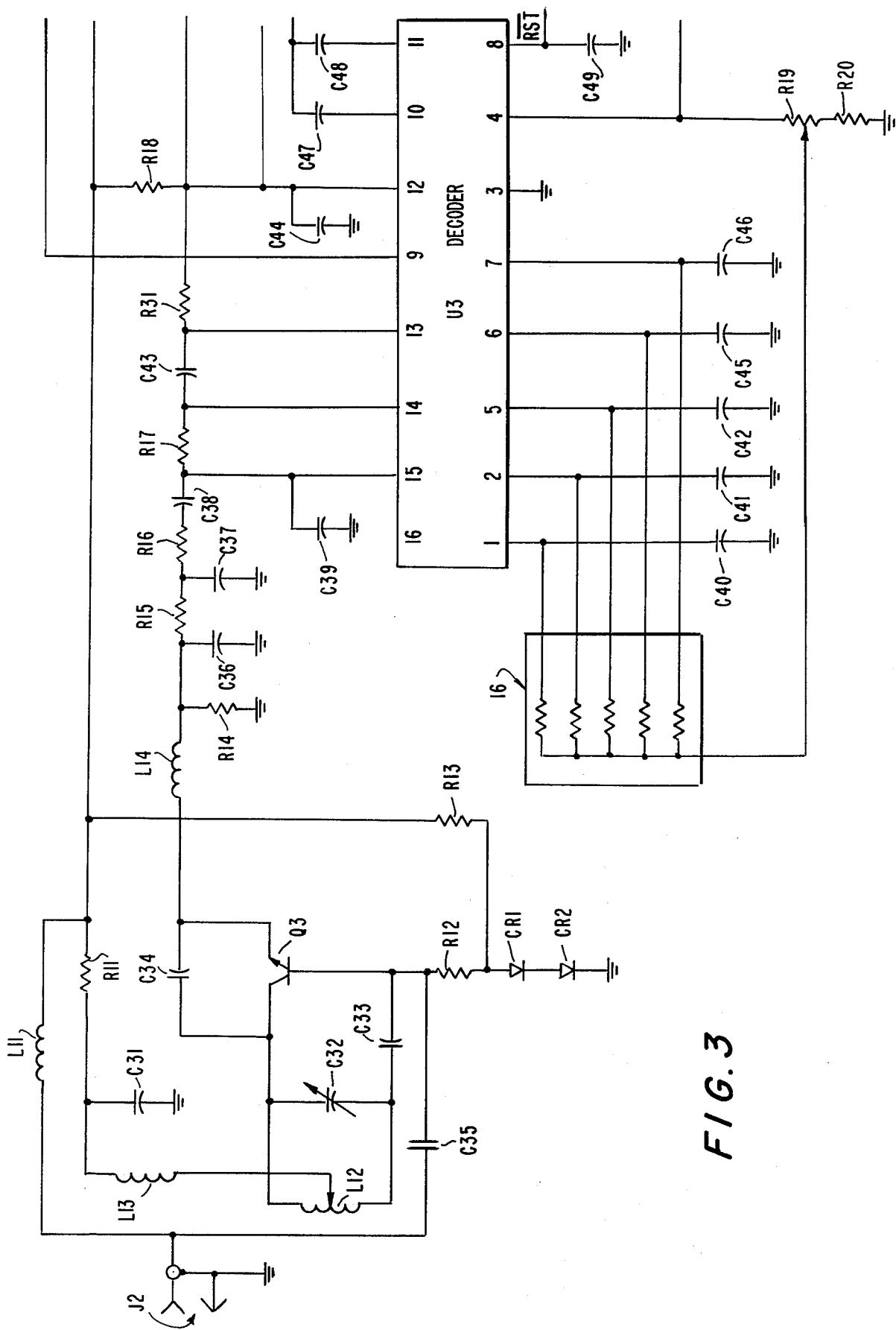
FIGS. 3-5 are a schematic of the receiver section of the receiver/logic unit which serves to detect and recognize the transmitted coded signal.

A resistor code cartridge 10 is associated with encoder chip U1 in the transmitter. (An identical resistor cartridge 16, FIG. 3, is associated with the decoder chip U3 in the receiver.) The code cartridge includes five resistors, and the value of each resistor determines the width of a respective one of the five pulses in the code which is transmitted; each resistor is connected to a respective one of pins 9-13 of chip U1. (Resistor R3 and capacitor C5 determine the 80-millisecond clock period.) The code cartridge consists of a thin-film resistor network on a ceramic substrate. As is known in the art, the individual resistors may be laser-trimmed to ±1% accuracy. In a typical manufacturing operation, four identical code cartridges are made for each system, one for the transmitter, one for the receiver, and two as spares or to allow additional transmitters to be configured for multiple operators.

The code cartridge in the receiver (FIG. 3), together with chip U3, operate as follows. If a start pulse longer than approximately 100 milliseconds is detected, the TMX 2151 decoder chip is enabled. The chip then examines the next five incoming pulses. If the first pulse has the correct width, then the second is examined; if the second has the correct width, then the third is examined; etc. Only if the entire sequence is correct, does the chip register receipt of the correct code. Although the operations of the two chips will be described herein, reference may also be made to TMX "Application & Design Notes Bulletin No. 751".

Battery B1 on FIG. 1 is a six-volt supply comprising four silver-oxide watch cells. Capacitor C15 by-passes the battery supply so that undesirable RF oscillations are attenuated. When push button S1 is depressed, the six-volt potential is applied to input pin 1 of chip U2, a three-terminal regulator. The regulator is configured in a standard manner, and a 2.9-volt potential is furnished at output pin 2. This potential is extended to pin 1 of chip U1 for powering the device.

The encoder chip first checks the charge on capacitor C3. As long as there is any charge on this capacitor, the code sequence is not generated. Resistor R2 and capacitor C3 have a time constant of approximately 30 seconds. Following any transmission of a code sequence, thirty seconds are required for the capacitor to discharge through the resistor; therefore the transmitter cannot be operated any more frequently than every thirty seconds, to comply with F.C.C. Regulations.

As long as pins 1 and 3 are not at equal potentials, the chip internally grounds pin 8. But as soon as capacitor C3 fully discharges through resistor R2 and the potentials at pins 1 and 3 are equal, a transmission sequence begins. Pin 8 is no longer grounded, and capacitor C5 charges through resistor R3 to a point determined by an internal comparator connected to pin 8. When capacitor C5 charges to approximately 1.6 volts, the comparator operates. It takes approximately 130 milliseconds for the capacitor to charge to this level, and during this time interval the start pulse is transmitted. The start pulse, and all pulses for that matter, consist of a "floating" potential at pin 4 of the chip; otherwise, the chip grounds pin 4. When capacitor C5 reaches a voltage level of approximately 1.6 volts, it immediately is discharged through pin 8 down to a level of approximately one volt. The start pulse terminates and pin 4 goes low. During this entire time, pin 2 is held grounded by the chip to discharge capacitors C1 and C2.

As soon as capacitor C5 discharges to one volt, pins 2 and 4 are ungrounded and the capacitor starts to charge once again, this time starting from a level of one volt, to the same "comparator" level of 1.6 volts. During this charging cycle, the chip internally connects pin 1 to pin 13. Thus current flows from the output of regulator chip U2 through chip U1, the left-most resistor in the code cartridge, resistor R1, and capacitors C1 and C2 in parallel. While capacitors C1 and C2 are charging, output pin 4 is held floating, enabling the first code pulse to be transmitted as will be described below. It should be noted that while comparator C5 first charges, output pin 4 is ungrounded so that the start pulse can be transmitted. The chip then rapidly discharges capacitor C5 and pin 4 is grounded only momentarily. As soon as the capacitor discharges to one volt, pin 4 is floated once again to control transmission of the first code pulse. There is only a short time interval of approximately 4 milliseconds which separates the end of the start pulse and the beginning of the first code pulse.

When the charge on capacitors C1 and C2 reaches approximately 1.6 volts, as detected at pin 2 of the chip, the chip grounds pin 2 to discharge the capacitors, pin 4 is grounded once again, and the first code pulse terminates. The chip waits a total of 80 milliseconds until capacitor C5 reaches a level of 1.6 volts, at which time the capacitor is once again rapidly discharged. It is thus apparent that resistor R1, capacitors C1 and C2, and a particular one of the five resistors in the code cartridge determine the width of each pulse which is transmitted, while capacitor C5 and resistor R3 determine the spacing between successive pulses. (The code cartridge resistors, resistor R1 and capacitor C1 and C2 must be selected such that each transmitted pulse has a width which is less than that of the inter-pulse spacing; otherwise, each transmitted pulse will be terminated prematurely and will simply be equal to 80 milliseconds in the illustrative embodiment of the invention. It is preferred to provide a maximum code pulse width of approximately 53 milliseconds. This insures that there is a substantial overlap so that the longest code pulse will be completed before capacitor C5 is discharged preparatory to the transmission of the next code pulse.)

After the first clock cycle of 80 milliseconds, capacitor C5 is rapidly discharged, and it then starts to charge once again from one volt to approximately 1.6 volts. During this charging cycle, the chip internally connects pin 12, rather than pin 13, to pin 1, so that charging current now flows through the code cartridge resistor connected to pin 12. During the charging process, pin 4 is floated so that another pulse is transmitted. When the charge on capacitors C1 and C2 rises to 1.6 volts, the two capacitors are discharged once again through pin 2, pin 4 is grounded, and the pulse terminates. After a total of 80 milliseconds have elapsed and capacitor C5 has charged to 1.6 volts, it is discharged back down to one volt and the sequence resumes. During the last three pulse transmissions, the code cartridge resistors connected to respective pins 11, 10 and 9 are coupled internally to pin 1. After the fifth pulse has been transmitted, pin 4 is held low and transmission ceases—even if the operator continues to hold push button S1 depressed.

Resistor R1 serves to linearize the pulse width for low values of code cartridge resistors. Capacitor C1 is the main charging capacitor, and capacitor C2, in parallel with it, adjusts the circuit for production variations in encoder chips. The value of capacitor C2 is determined by test during manufacture.

In the illustrative embodiment of the invention, the code cartridge resistors vary from approximately 4.76K to approximately 164.6K, corresponding to respective pulse widths of 1.52 and 52.5 milliseconds. By lengthening the clock pulse from 80 milliseconds to 100 milliseconds, for example, the code pulse widths may be increased, thus allowing for even more code combinations.

Capacitors C1, C2 and C5 are preferably precision 5% polycarbonate capacitors having low capacitance variation with temperature. Resistor R3 is a metal film-type resistor which also has a low variation with temperature, and is selected during manufacture to generate an inter-pulse interval as close as possible to the desired 80 milliseconds. If the 30-second inter-group delay is not required, capacitor C3 and resistor R2 may be omitted, with pin 3 of chip U1 being connected directly to pin 1.

The circuitry on the right side of FIG. 1 comprises the RF section of the transmitter. The circuit is designed to achieve maximum radiated power (within the limits allowed by F.C.C. Regulations) and adequate frequency stability. The circuit can also be realized at low cost, and it allows a transmitter to be manufactured having a very compact size.

There are various "conflicts" in these several objectives. If the transmitter is to be of low cost, a crystal may not be used as a frequency-determining element; the oscillator must be "free-running", that is, it must utilize lumped-circuit components to establish its operating frequency. But because of the compact size of the transmitter, the proximity of the operator's hand to the circuit elements tends to affect the operating frequency principally through hand-capacitance effects, something which is usually avoided only by utilizing a crystal oscillator. Nor can the unit be completely shielded to avoid such effects, or else there would be little radiated power.

As will be described below with reference to FIGS. 1A–1C, power radiation is accomplished by utilizing an antenna loop which is an etched circuit trace extended around the periphery of the printed circuit board on which the various components are mounted in the transmitter unit (although a wire loop can be used). In some inexpensive transmitters of this type, such as those used in electronic garage door openers, this kind of antenna loop forms the inductive portion of the frequency-determining tuned circuit of the oscillator. But because conventional garage door transmitters are relatively large, they may be designed such that the operator's hand does not envelop the antenna loop during operation, and satisfactory frequency stability may therefore be achieved. But the transmitter of the illustrative embodiment of the invention measures only 1.5"×2.7"×0.6", and during operation the transmitter is completely enclosed. The physical separation of the hand from the antenna loop is less than ⅛" and, if the loop is used as part of the frequency-determining circuit, serious detuning of the operating frequency may result—as much as 10 MHz around a center frequency of 340 MHz (the center frequency in the illustrative embodiment of the invention). The 3-dB bandwidth of a typical receiver may be only approximately 2 MHz, and therefore the transmitter stability should be in the order of 1 MHz, under worst-case conditions. The RF portion of the transmitter achieves the requisite stability, despite the fact that a single transistor is utilized without the benefit of a crystal.

The key to the operation is that the antenna loop is tuned to about twice the oscillator frequency, and it does not form part of the oscillator circuit, even though it is coupled into the collector of the oscillator transistor Q1. The frequency-determining tuned circuit is a positive feedback configuration coupled across the base-emitter junction of the transistor. The oscillator frequency is actually one-half of the desired radiation frequency, 170 MHz in the illustrative embodiment of the invention. The transistor, in addition to being the active element in the oscillator, also acts as a frequency-doubler; the collector circuit, including the etched antenna, is tuned to the second harmonic of the oscillator frequency, 340 MHz. The capacitance effects introduced by the operator's hand do change the antenna tuning. However, the radiated frequency is determined by the lumped-circuit elements and the fact that the transistor doubles the operating frequency. Thus the transmitted frequency is only minimally affected by the operator's hand. (As will be described below, hand-caused detuning, which is certain to occur, is actually used to advantage, and frequency stability is further improved by the use of shielding.) In practice, an overall oscillator frequency stability of 170 MHz±0.25 MHz can be achieved, which translates to a radiated frequency stability of 340 MHz±0.5 MHz. Furthermore, because of the compact nature of the 170-MHz oscillator components, particularly the oscillator coils, they do not radiate efficiently, thus minimizing the undesired radiation of a 170-MHz frequency. The selectivity of the tuned circuit formed by the antenna loop tuned to 340 MHz also minimizes undesired radiation of the 170-MHz fundamental as well as all other undesired harmonics such as the third.

When push button S1 is closed, battery potential is furnished to the oscillator circuit. The antenna loop 12, consisting of a trace etched on the periphery of the printed circuit board, is tuned to the desired radiation frequency by a combination of stray capacitance 13 and adjustable trimmer capacitor C9. This latter capacitor is tapped approximately one-third along the length of the antenna loop in order to utilize a practical trimmer value and range. Inductor L3 is a matching inductance which serves to match the relatively low output impedance of transistor Q1 to the relatively high impedance of the antenna loop. Capacitor C14 is a conventional by-pass capacitor.

Inductors L1 and L2, in series, form the oscillator inductance. Inductor L2, the smaller of the two, is adjusted to allow a "vernier" adjustment of frequency during alignment. The two inductors are tuned to 170 MHz by capacitors C12 and C13 in series. The two capacitors form an impedance matching circuit to match the low impedance of the emitter of the transistor to the high impedance of the tuned circuit which is coupled to the base of the transistor by capacitor C11. Positive feedback exists between the emitter and base, and the voltage gain arising because of the impedance ratio of capacitors C12 and C13 is sufficient to sustain oscillation at 170 MHz across the tuned circuit. The values of capacitors C11, C12 and C13 are chosen to maximize second harmonic distortion in the emitter-base junction of the transistor, since it is the second harmonic component which is amplified in the collector circuit of transistor Q1 (the antenna loop tuned to 347.5 MHz).

The emitter bias resistor R7 is selected in the factory during alignment of the transmitter so that the radiated power is the maximum allowed by F.C.C. Regulations. (The small physical size of the transmitters precludes the use of a potentiometer for resistor R7 for the purpose of adjusting the power.)

The base bias resistor R5 is connected to pin 4 of chip U1. Pin 4 is internally connected to the collector of a transistor within the chip which is turned on or off according to the start and code pulse sequence. Resistor R6 is the pull-up resistor for this transistor and is returned to the six-volt battery supply. (Capacitor C8 is a by-pass capacitor for resistor R6, but is not large enough to degrade the rise and fall times of the low-frequency code pulses that develop across resistor R6.)

When the transistor connected to pin 4 within chip U1 is turned on, pin 4 of the chip is grounded and transistor Q1 is held off. But when the transistor within the chip is turned off, whenever a pulse is to be transmitted, the voltage at pin 4 rises toward the battery supply because of the action of the pull-up resistor R6. Transistor Q1 then has a positive base-emitter bias and oscillates at full power. The transistor thus generates a carrier which is 100% amplitude modulated by the start and code pulse sequence generated by chip U1.

The antenna loop is not actually tuned to a frequency of 340 MHz. Instead, it is tuned approximately 2% higher, to a frequency of 347.5 MHz. The reason for this is that the presence of the operator's hand, which envelops the transmitter during operation, has the effect of reducing the radiated power, in comparison with a transmitter operation in free space. The human hand is a partial conductor and, when enveloping the transmitter, absorbs some power through eddy current effects. At the same time, hand capacitance effects detune the antenna loop to a somewhat lower frequency than that existing under free-space conditions. Were the free-space tuning of the antenna loop adjusted to 340 MHz, the total loss of radiated power due to the two hand effects (detuning and power absorption) would be sufficient to markedly reduce the effective signaling range as compared to the range under free-space conditions. But by tuning the antenna loop to a somewhat higher frequency under free-space conditions, the free-space radiation is reduced because the carrier frequency is on the slope of the antenna characteristic. Resistor R7 is adjusted in the factory to increase the free-space radiated power to the maximum permissible under F.C.C. Regulations. When the transmitter is then enveloped by the hand, the hand capacitance lowers the tuned frequency to approximately its desired center frequency of 340 MHz and the radiated power from the loop increased. This increase in radiated power by shifting the peak of the antenna response towards the carrier frequency compensates for the loss due to absorption by the operator's hand. By choosing a free-space antenna frequency of 347.5 MHz, the two hand effects almost exactly counter-balance each other and the transmitter signaling range is constant (and a maximum) independent of whether the transmitter operates in free space or is clasped tightly by the operator.

It should be noted that no matter how the antenna is detuned, the second harmonic component generated by the oscillator circuit remains relatively constant (340 MHz±0.5 MHz), since a fixed carrier frequency is necessary.

The transmitter unit itself is shown in FIGS. 1A–1C. The unit includes a base section 100 and a cover section 104. The base includes a lip 108 and the cover includes a tab 116 so that the two units may be snapped together as is known in the art. The base has two holes 106 in which four batteries may be placed, as is also known in the art. A printed circuit board 102 fits within the base, and is connected to the batteries. A clip 118 on the cover serves to connect the two pairs of batteries in series with each other. Ledge 109 in the cover bears down against circuit board 102 and holds it in place. The circuit board is not shown in FIG. 1B as containing any of the circuit components, although it is to be understood that they are all mounted on it. FIG. 1B as shown primarily for its depiction of the antenna loop 110 which actually comprises a trace on the copper foil near the edge of the circuit board. The antenna is shown connected by conductor 112 (to the collector of transistor Q1 in FIG. 1).

The effects of hand capacitance are minimized by providing partial shielding of the components which comprise the oscillator. A sheet of copper foil 107 is affixed inside the plastic base 100, and another copper sheet (not shown) is disposed underneath insulating sheet 120 in the cover. The two sheets partially enclose the oscillator components—but not the antenna loop itself. The push-button S1 is shown in phantom in FIG. 1A; it is mounted on the face of base section 100 of the transmitter unit.

A thorough description of the RF portion of the circuit of FIG. 1 will be found in the co-pending application of Patrick R. J. Court, entitled "Miniature Transmitter and Method for Making Same", filed on even date herewith and assigned to the assignee of this application, which Court application is hereby incorporated by reference.

Figure 2:
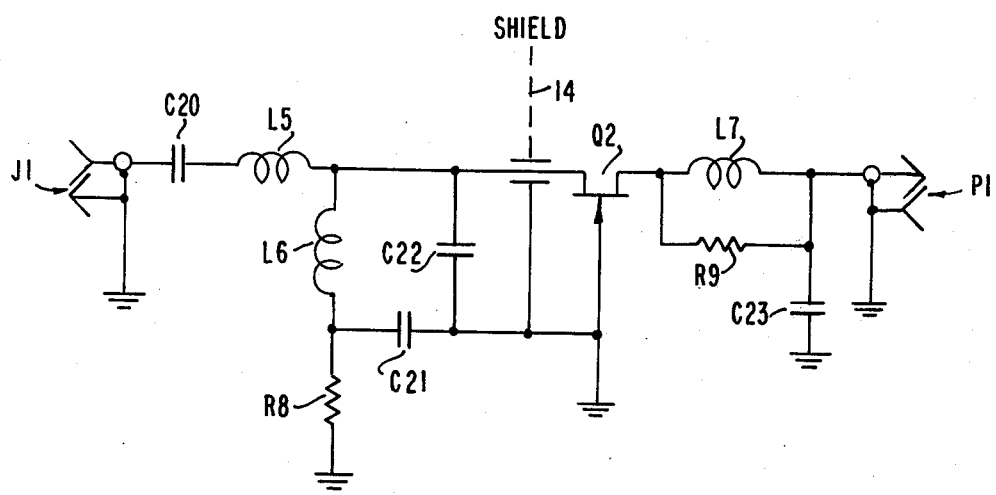
FIG. 2 is a schematic of a buffer amplifier, which serves as the input section of the overall receiver/logic unit which is typically placed in the trunk of the vehicle.

FIG. 2 depicts a buffer amplifier which is connected between the receiver antenna and the receiver circuitry. The purpose of the buffer amplifier is to isolate the antenna from the undesired interference created by the super-regenerative receiver, and to isolate the super-regenerative receiver from the uncertain and variable impedance presented by the antenna. Although the buffer amplifier is shown as a separate unit, it is to be understood that it may be made part of the overall unit which is included in the vehicle, which unit includes the buffer amplifier, the receiver, and the logic which controls the various functions which are performed when a proper pulse code sequence is detected.

The receiver itself, to be described below, contains a super-regenerative detector which is basically a self-quenching oscillator. While this type of detector is very simple and sensitive, it has the disadvantage of creating unwanted interference when coupled into an antenna, and the interference thus radiated by the receiving antenna may exceed that permitted by F.C.C. Regulations. The antenna buffer amplifier of FIG. 2 provides more than 20 dB of backward isolation to the antenna, and reduces undesired radiation interference to well below that which can be tolerated.

The antenna itself (not shown) may be a simple quarter-wave whip with a nominal impedance in free space of 75 ohms. The antenna may be mounted in a variety of locations within a conventional automobile. Due to the large quantity of steel used in a conventional automobile and the different shapes and sizes of the vehicle which may surround the antenna, there may be profound effects on the apparent impedance of the antenna. If the receiver is used without the buffer amplifier of FIG. 2, the variable impedance provided by the antenna could seriously degrade the performance of the super-regenerative detector. The antenna buffer amplifier isolates the antenna from the receiver and the impedance presented to the receiver is essentially constant (75 ohms) regardless of the antenna location.

Although not shown, preferably the antenna buffer amplifier is contained within a small shielded enclosure, provided with an input jack J1 for the antenna and an output plug P1 which plugs directly into the input jack of the receiver. Power for the antenna buffer amplifier is fed through the output plug from the receiver, as will become apparent when the receiver circuitry is described.

Transistor Q2 is a high-frequency junction field effect transistor (J-FET) with a very high forward transconductance, designed for grounded-gate operation. Its input impedance measured at the source is approximately 75 ohms. The signal from the antenna is coupled through the input jack J1 and is first operated upon by the broadly tuned input matching circuit comprising capacitor C20, inductor L5, and capacitor C22. The center frequency of the tuned circuit is 340 MHz, corresponding to the carrier frequency. Inductor L6 is a choke whose reactance is much greater than the input impedance of transistor Q2, and serves to provide a DC return path from the source to ground through bias resistor R8. Resistor R8 is by-passed by capacitor C21, and the transistor gate is grounded directly.

Inductor L7 and capacitor C23, in conjunction with the stray drain capacitance of transistor Q2, form a pi-matching network to the output plug. Resistor R9 serves to load the circuit to increase its bandwidth. The impedance presented to the antenna through input jack J1 is 75 ohms, and the impedance presented to the receiver through output plug P1 is also 75 ohms.

A partition shield, shown by the numeral 14, within the amplifier serves to isolate the input and output circuits from each other, thereby improving still further the backward isolation. The overall bandwidth is very broad—approximately 60 MHz—thereby eliminating strict tuning requirements and allowing buffer amplifiers to be interchanged without any perceptible change in the overall performance of a particular receiver.

Figure 4:
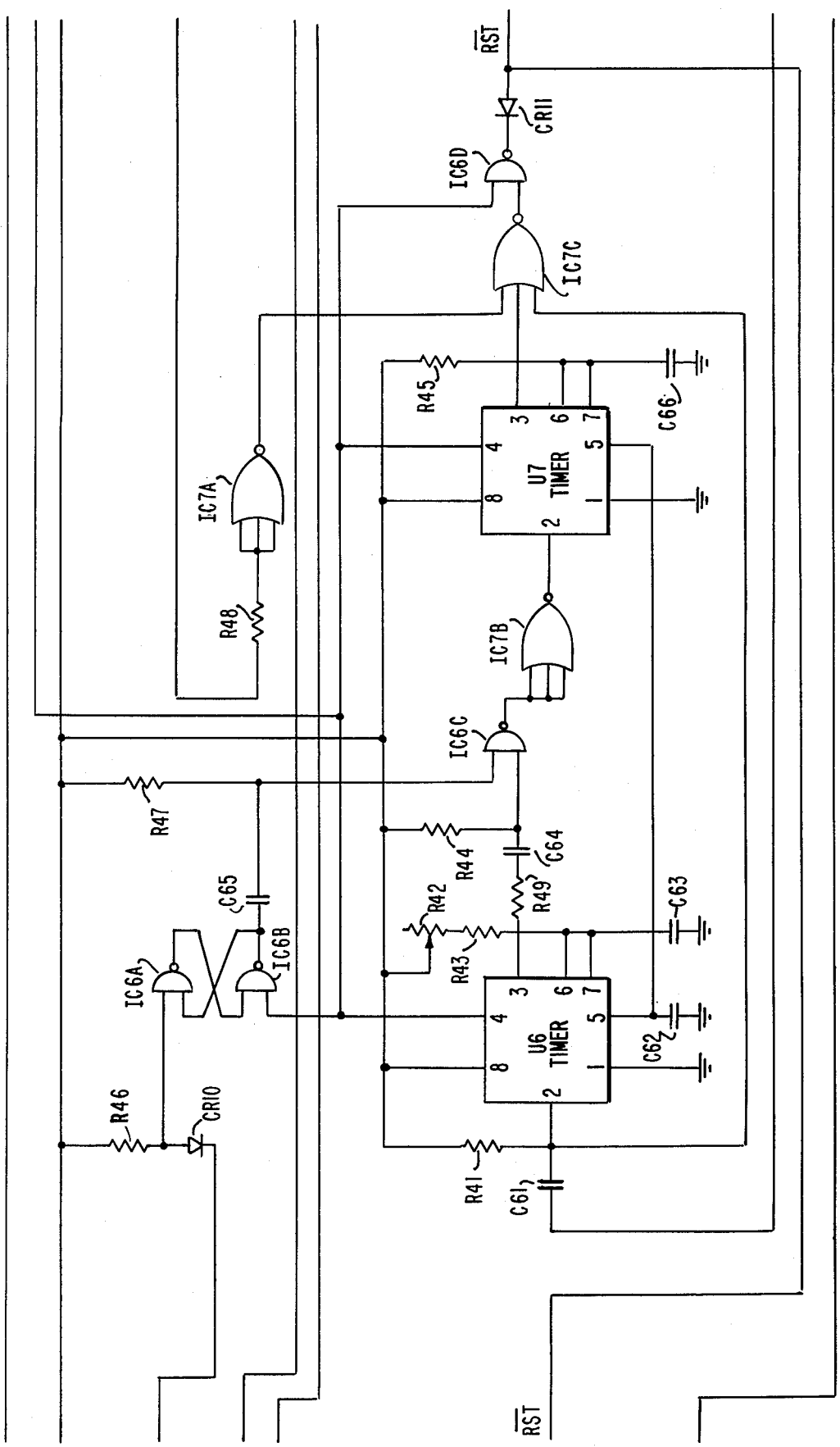
Figure 5:
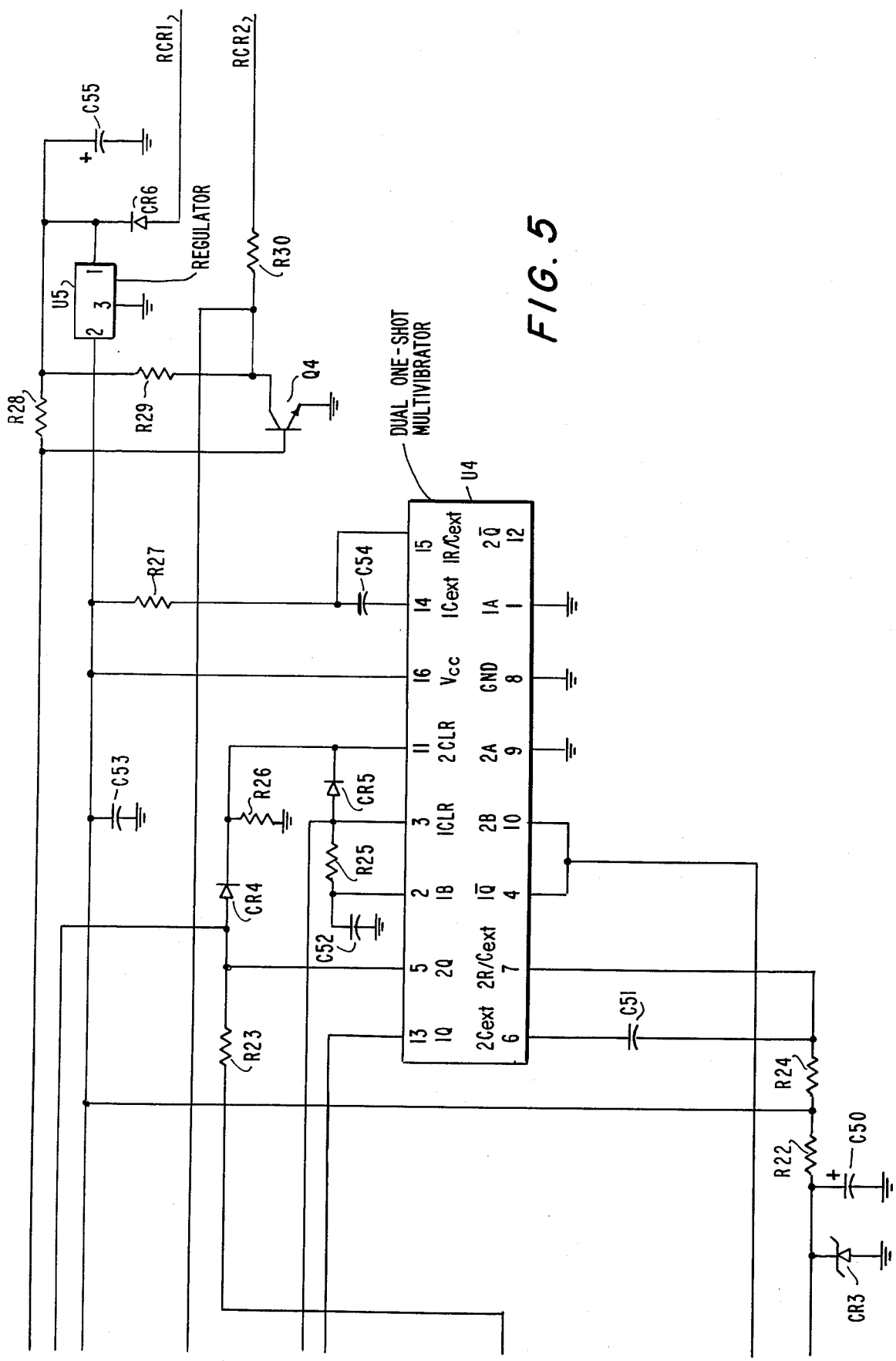

The unit which is installed in the vehicle consists of the buffer amplifier (which may be thought of as part of the receiver), the receiver and the logic circuit. The latter controls various functions in the vehicle whenever a transmitted code is detected. The code itself is detected by the receiver which is shown in FIGS. 3–5, with FIG. 3 being placed to the left of FIG. 4 and FIG. 5 being placed to its right.

Input jack J2 (FIG. 3) is connected to output plug P1 of the buffer amplifier (FIG. 2). Input jack J2 feeds into a super-regenerative receiver whose active element is transistor Q3. Power for the receiver is derived form pin 2 of regulator chip U5 (FIG. 5). A super-regenerative receiver, in general, is basically an oscillator with a tightly coupled positive feedback loop, and with a relatively large time constant in its self-biasing circuit. The circuit "self-quenches", that is, it biases itself off, shortly following the build-up of oscillations. When the bias voltage decays, the oscillations begin again, following which the circuit self-quenches. The repetition rate of self-quenching is known as the "quench frequency" and is designed to be substantially higher than the highest modulation frequency to be detected. Each time the self-bias decays and the oscillator begins to conduct, it acts as an extremely sensitive amplifier because of the high degree of positive feedback of the circuit. If a signal from an antenna at a frequency close to the oscillating frequency is coupled into the circuit, the build-up of oscillations is initiated slightly sooner than it would be without the antenna signal. As a result, the quench frequency increases slightly in the presence of an input signal, and the increase is approximately proportional to the level of the antenna signal.

The oscillator conducts heavily during perhaps one or two cycles of oscillation, and then remains non-conducting during the quench period. The quench period may be 10-20 times longer than the conduction period, so that the oscillator is non-conducting most of the time. The oscillator current consists of extremely short pulses with a repetition rate equal to the quench frequency.

In the presence of an incoming amplitude-modulated carrier signal, the repetition rate of the current pulses varies in proportion to the carrier modulation, the rate being greatest when the carrier amplitude is at a maximum, and the rate being lowest when the carrier amplitude is at a minimum. The total current through the oscillator is proportional to the number of current pulses per second; by integrating the current pulses (or the voltage pulses developed by these current pulses across a resistor), a signal may be recovered which corresponds to the modulation envelope of the carrier. If the envelope comprises 100%-modulated pulses, the recovered signal will comprise the pulse-train forming the original modulation.

Transistor Q3 is arranged in an oscillating circuit which is basically a Hartley type, with signal phase reversal occurring across the center-tapped coil L12. The coil is tuned by capacitor C32 to a center frequency of 340 MHz. Positive feedback occurs between the collector and base of transistor Q3, and additional positive feedback is provided by capacitor C34 which is connected between the transistor collector and emitter. The powering potential for the oscillator is provided through the by-pass network comprising resistor R11 and capacitor C31, coupled into the center tap of inductor L12 through choke L13. The received signal at input hack J2 is coupled to the base of transistor Q1 through capacitor C35. Choke L11 is used to furnish a DC supply to the antenna buffer amplifier through input jack J2, and isolates the input signal from the source of power for the receiver.

The powering potential itself is derived from chip U5 (FIG. 5), a 5-volt regulator. Power is furnished to the chip at pin 1 from the car battery which is connected to conductor RCR1 as will be described below, through diode CR6. Diode CR6 in conjunction with capacitor C55 allows the unit to be used not only with a 12-volt car battery source, but even with an AC power source of approximately 12 volts RMS. The output of the regulator powers chip U4 directly at pin 16; through resistor R22, capacitor C50 and Zener diode CR3 it supplies regulated power at a slightly lower voltage to the decoder chip; and through chokes L11 and L13 it powers the buffer amplifier and the super-regenerative receiver, respectively.

On FIG. 3, resistor R13, and diodes CR1 and CR2 are connected between the potential source and ground. The sum of the two diode junction drops (approximately 1-volt total) is applied to the base of transistor Q3 through resistor R12 as a bias voltage. Resistor R14 is the emitter bias resistor for the transistor, by-passed by capacitor C36. Inductor L14 acts as an RF choke.

As a result of the positive feedback between the collector and both the base and the emitter of transistor Q3, the transistor oscillates. The resulting voltage, coupled to the base of transistor Q3 through capacitor C33, builds up rapidly and the current flow through transistor Q3 charges capacitor C36. The coupling time constant determined by capacitor C33 and resistor R12 is very large relative to the period of oscillation, and the base current flow in transistor Q3 during the positive peaks of the oscillating waveform causes capacitor C33 to become negatively charged. Eventually, transistor Q3 becomes biased off and the oscillations cease, that is, the circuit self-quenches. Capacitor C36 then discharges through resistor R14, and capacitor C33 discharges through resistor R12. When both capacitors discharge, the transistor attains normal bias conditions and oscillations begin again. The sequence repeats itself at a periodic rate, the quench frequency being determined by the two time constants (C33)(R12) and (C36)(R14).

Because of the periodic rapid charge of capacitor C36 through transistor Q3 and its slower periodic discharge through resistor R14, a sawtooth waveform is developed across the capacitor and resistor at the repetition rate of the quench frequency. Incoming signals, coupled to the base of transistor Q3 through capacitor C35, modulate the frequency of the sawtooth wave, the frequency being highest when the incoming signal amplitude is at a maximum and being lowest when the incoming signal amplitude is at a minimum.

The frequency-modulated sawtooth waveform is integrated by the two time constants (R15)(C37) and (R16)(C39) which completely filter out the sawtooth waveform, leaving only the lower frequency signal corresponding to the modulation envelope of the incoming carrier signal. Capacitor C38 is a blocking capacitor and isolates the DC voltage existing across resistor R14 from pin 15 of chip U3, to which pin the demodulated signal is applied.

The incoming signal from input jack J1 is the carrier signal generated by the transmitter, the carrier signal being 100% amplitude-modulated with the start and code pulse sequence. Thus the code pulse sequence forms the demodulated output of transistor Q3 and is applied to pin 15 of chip U3—the TMX 2151 decoder chip. In the illustrative embodiment of the invention, the quench frequency is approximately 750 KHz, and the three dB bandwidth is approximately 2 MHz centered around 340 MHz.

The demodulated RF signal, of low amplitude, is applied to the decoder chip at pin 15. It is amplified internally, and the amplified signal at pin 14 is coupled through capacitor C43 to pin 13. The signal at pin 13 is similarly amplified internally and the amplified signal is applied at pin 12, from which it is fed to inputs of the dual one-shot multivibrator chip U4 (which chip comprises two one-shot multivibrators).

The first section of the dual one-shot multivibrator is configured such that it recognizes the start pulse from the transmitter. If a pulse (of the correct frequency) is present which is longer than approximately 100 milliseconds, the decoder chip U3 is "released" by the first one-shot multivibrator so that the former may begin a code acceptance sequence. At the same time, the second multivibrator in chip U4 is triggered and a pulse which is approximately 0.7 second long is generated. If during this 0.7 second a correct code sequence is not received, the second one-shot multivibrator times out, it resets the decoder chip to its off state, and the system waits for the next start pulse.

If a code sequence is present, the decoder chip accepts five code pulses and sequentially charges capacitors C40, C41, C42, C45 and C46 through respective resistors in code cartridge 16, this code cartridge corresponding to the code cartridge in the transmitter (FIG. 1). If all five pulses are in the correct order and they "match" the widths represented by the code cartridge, the decoder chip generates a high output at pin 9. This causes transistor Q4 to be turned on and a low output appears on conductor RCR2. This conductor is extended to the logic section of the system, as will be described below.

The entire code acceptance sequence requires approximately 450 milliseconds (130-ms START pulse plus four code pulse 80-millisecond clock cycles). Since the second one-shot generates a pulse of 700 milliseconds in width starting about 100 milliseconds into the 130-millisecond start pulse, output transistor Q4 remains on for the difference between 700 and 350 milliseconds, or approximately 350 milliseconds.

The system will now be described in greater detail, in two parts. First, it will be described as though it operated asynchronously, that is, as though the operation were not keyed to the transmitter timing. Then those parts of the system which cause the system to operate synchronously will be described, together with the reasons for the conversion.

The demodulated and filtered RF signal is applied through capacitor C38 to pin 15 of the decoder chip, capacitor C39 acting to by-pass unwanted high frequency noise. An internal operational amplifier between pins 15 and 14 amplifies the signal, the gain of the operational amplifier being determined by external resistor R17. The output at pin 14 is coupled through capacitor C43 to pin 13, which is the input of another internal operational amplifier whose output is connected to pin 12. Resistor R31 sets the gain of this second operational amplifier. The output at pin 12 is a square wave approximately 3 volts in amplitude and whose format is identical to that of the signal from the transmitter. Whenever the transmitter is generating an RF carrier, the voltage at pin 12 is high; whenever the transmitter is off, the voltage at pin 12 is low. The first waveform on FIG. 6 represents the "demodulated RF" at pin 12 of chip U3.

When pin 12 of chip U3 first goes high (with transmission of the start pulse), two things happen. First, pin 3 of chip U4 goes high; this allows the first one-shot multivibrator on chip U4 to be fired, although the one-shot is not yet triggered. Second, pin 11, the clear input for the second one-shot multivibrator, is also pulled high through diode CR5, thus allowing the second one-shot to fire when pin 10 ultimately goes high.

Capacitor C52 and resistor R25 introduce a short delay; when pin 12 of chip U3 goes high, pin 3 of chip U4 goes high immediately but it requires approximately 15 microseconds before pin 2 of chip U4 goes high. A high potential applied at this latter pin fires the first one-shot multivibrator on chip U4, and a short delay is introduced to allow the clear input of this multivibrator (pin 3) to settle. When pin 2 goes high, the positive true output of the first one-shot goes high at pin 13. A positive pulse is thus applied to the decoder chip at pins 10 and 11, through capacitors C47 and C48. Capacitor C48 and an internal resistor at pin 11 form a differentiator which looks at the leading edge of the pulse. Capacitor C47 and a similar internal resistor at pin 10 form a differentiator which looks at the trailing edge of the pulse.

After approximately 100 milliseconds, the first one-shot multivibrator times out, and pin 13 goes low. It is now pin 4, the negative true output of the first multivibrator, which goes high. Since this pin is connected to pin 10, the trigger input for the second one-shot multivibrator, the second multivibrator fires. But this multivibrator fires only if its clear input (pin 11) is high in potential. Assuming that the signal being received is a valid start pulse from the transmitter, pin 12 of the decoder chip is still high and holds pin 11 of chip U4 high, allowing the time-out of the first multivibrator to trigger the second multivibrator.

This arrangement is designed to distinguish between a valid start pulse and any RF noise which may be present. Pin 12 of the decoder chip follows the RF noise. Although it may go high momentarily, and thus result in triggering of the first one-shot multivibrator, if pin 12 of the decoder goes low before the first multivibrator times out, both of pins 3 and 11 go low; these are the two pins which are the clear inputs of the respective multivibrators. With pin 11 low, it prevents the second multivibrator from being triggered. The circuit is designed so that pin 12 of the decoder chip must remain high for at least 100 milliseconds for a start pulse to initiate a code recognition sequence—when pin 12 first goes high at the beginning of a start pulse, the first one-shot is fired, and the time-out of the first one-shot triggers the second only if pin 12 of the decoder is still high.

When the second one-shot fires, its positive true output (pin 5 of chip U4) goes high. The $\overline{\text{high}}$ potential is extended through resistor R23 to the $\overline{\text{RST}}$ conductor. This conductor is connected to pin 8 of the decoder, the master reset input. When this input goes high, the decoder is enabled and begins to recognize the code pulse sequence. Capacitor C49, connecting pin 8 of chip U3 to ground, simply suppresses unwanted high frequency noise. The positive potential at pin 5 of chip U4 is also extended through diode CR4 to pin 11 of chip U4, the clear input of the second one-shot. Prior to the firing of the first one-shot, the positive potential from pin 12 of the decoder chip is extended through diode CR5 to pin 11 of chip U4. Since pin 12 follows the received code pulse sequence, the first time that pin 12 goes low, at the termination of the start pulse, diode CR5 no longer extends a positive potential to pin 11 of chip U4, and the second one-shot multivibrator would abruptly and prematurely time out. Thus the 700-millisecond positive pulse which appears at pin 5 of chip U4 is extended through diode CR4 to pin 11 to hold the second one-shot on. Diodes CR4 and CR5 thus form an OR gate; the second one-shot is allowed to fire and remain fired if either pin 12 on the decoder chip is high, or if the output of the second one-shot on chip U4 is high.

It should be noted that in the case of RF noise, although pin 12 of chip U3 goes high and triggers the first one-shot, as soon as pin 12 goes low, both of the clear inputs at pins 3 and 11 of chip U4 go low. The first one-shot terminates its pulse abruptly and pin 4 of chip U4 goes high. Ordinarily, it is when this pin goes high that the second one-shot is fired. However, because pin 11 is now low, and pin 11 goes low before pin 4 goes high due to the short but finite delay between pin 3 going low and the first one-shot terminating its pulse, the second one-shot does not fire. Pin 5 on chip U4 remains low, and the low potential on the $\overline{RST}$ conductor at pin 8 of chip U3 disables the decoder from operating. It is only if pin 12 of chip U3 goes high and remains high for 100 milliseconds that the decoding operation is enabled, and that will not usually result from RF noise. It is apparent, therefore, that the period of the first multivibrator is selected so that it is *shorter* than the duration of the start pulse—the start pulse must hold pin 11 of chip U4 high when the first one-shot times out. The period of the first one-shot is *longer* than the longest code pulse for a different reason. In operation, the demodulated RF signal at pin 12 of chip U3 contains a great deal of random noise. This noise can be considerably attenuated by passing the signal through the first one-shot, due to the inherent noise immunity of its CMOS construction. By making the period of the first one-shot longer than the longest code pulse, pin 12 of chip U3 will both start and stop the operation of the first one-shot. That is, with the exception of the start pulse, whenever pin 12 of chip U3 is high, pin 13 of chip U4 will be high, and whenever pin 12 is low, pin 13 will be low. In addition, the inherent "amplifying" effect of the one-shot provides an output waveform with fast rise and fall times for the next stage in the decoding process. Thus, the waveform at pin 13 of chip U4 is a "cleaned-up" version of the waveform at pin 12 of chip U3.

The signal at pin 13 of chip U4 is the positive true output of the first multivibrator, and it is coupled to pins 10 and 11 of chip U3. The signal at pin 13 is the same as the signal at pin 12 of chip U3 (except during the start pulse) since the output of chip U3 at pin 12 is connected to pins 2 and 3 of chip U4—whenever a start or code pulse is being received, the positive true output of the first multivibrator at pin 13 is high (except that it goes low before the end of the start pulse since the period of the first one-shot is shorter than the start pulse). Thus during the code recognition sequence, which sequence begins as soon as the second one-shot fires and the $\overline{RST}$ conductor goes high, the leading edge of each code pulse can be detected at pin 11 of chip U3 and the trailing edge can be detected at pin 10. The leading edge of the first code pulse occurs about 4 milliseconds after the trailing edge of the start pulse, as determined by the transmitter operation. It should be noted that pin 8 of chip U3 goes high as soon as the first one-shot times out, before the start pulse has terminated. But the decoder chip U3 "does nothing" at this time because there is no edge at either of pins 10 or 11. It is true that pin 5 of chip U4 goes high as soon as the first one-shot times out, and at the "same time" pin 13 of chip U4 goes low to allow a trailing edge to be detected at pin 10 of chip U3. However, capacitor C49 and resistor R23 delay the application of a high enabling signal to pin 8 of chip U3 until after the edge has appeared at pin 10. Thus the first operative edge which is applied to chip U3 is the leading edge of the first code pulse which appears at pin 11, this leading edge occurring after the decoder has been enabled by a high potential at pin 8.

The leading edge of the first code pulse at pin 11 causes the decoder chip to unground pin 1, all of pins 1, 2, 5, 6 and 7 normally being grounded internally by chip U3. With pin 1 ungrounded, capacitor C40 starts to charge from current which flows through the connected resistor in code cartridge 16. The DC supply at the output of pin 2 of regulator chip U5 (FIG. 5) is extended through resistor R22 to pin 4 of chip U3 for powering the chip. It is also applied across resistor R20 and potentiometer R19, the setting of the potentiometer thus determining the charging current for capacitor C40 (and comparable capacitors C41, C42, C45 and C46 when their respective chip pins 2, 5, 6 and 7 are ungrounded). When pin 13 on chip U4 goes low at the end of the first code pulse, the trailing edge is detected at pin 10 of chip U3. At this time, a voltage comparator inside the decoder chip compares the voltage across capacitor C40—the potential at pin 1—with half of the supply voltage (approximately 1.6 volts) furnished to the chip. If the two voltages are equal to within ±17%, the decoder accepts the first code pulse as being of the correct width.

When pin 13 of chip U4 goes high at the start of the second code pulse, the leading edge is detected at pin 11 of chip U3, pin 2 of the decoder is ungrounded, and capacitor C41 starts to charge through its respective resistor in the code cartridge. The trailing edge of the second code pulse is detected at pin 10, at which time the decoder checks the voltage across capacitor C41. If the voltage "matches" (to within ±17%) 1.6 volts, the decoder assumes that the second code pulse is of the correct width. This process continues for the remaining three code pulses.

If all five code pulses are of the correct width, pin 9 of the decoder goes high. The high potential which is extended directly to the base of transistor Q4 causes the transistor to turn on. As long as pin 9 is at its normal low potential, the high potential on conductor RCR1 (which, as will be described below, is derived from the car battery) is extended through resistor R29 to the collector of transistor Q4. But with pin 9 of the decoder going high, transistor Q4 turns on and its collector is coupled through the transistor to ground. The low potential at the collector of the transistor is connected through resistor R30 to conductor RCR2; the low signal on this conductor informs the logic that a valid code pulse sequence has been detected. Pin 9 of the decoder remains high until pin 8 goes low and the entire decoder chip is reset. This occurs after the second one-shot multivibrator has timed out and, as described above, the low signal on conductor RCR2 is present for approximately 350 milliseconds.

Potentiometer R19 is provided so that compensation may be made for production variations in the decoder chip. During production, the potentiometer is moved toward one end of its range until the decoder chip ceases to decode properly, it is then moved toward the other end of its range until the decoder ceases to decode properly, and then it is permanently set in the middle of the two test extremes. This procedure ensures optimum decoding for different codes.

From the foregoing description of the receiver operation, it would appear that the receiver operates in an asynchronous fashion; it simply looks at each incoming clock pulse and examines its width. As long as the five pulses are in the correct order and have the correct widths, it makes no difference how long a time interval exists between pulses. But this is in fact not the case.

In order to insure that the receiver is not operated by random noise, a synchronous timing requirement is added to the system. It will be recalled that the leading edges of all five code pulses are separated by approximately 80 milliseconds by the transmitter. The additional circuitry in the receiver causes it to operate in a synchronous fashion by imposing still another requirement: the leading edges of the received code pulses must be separated by approximately 80 milliseconds. It is not enough that the five code pulses have the proper widths. It is also necessary that the leading edge of each pulse occurs in the proper time frame.

The transmitter exhibits a variation in clock rate with temperature. Under actual operating conditions, the clock rate may vary from approximately 74 milliseconds to 86 milliseconds. Thus at the end of five code pulses, there may be a cumulative error of approximately 30 milliseconds in either direction from the desired 80-millisecond time frame reference. It is therefore not possible to utilize a circuit in the receiver with a stable 80-millisecond time reference and to check that the leading edges of successive code pulses are separated by 80 milliseconds, because variations in the transmitter would make such a receiver unusable. Instead, a mechanism is provided for synchronizing the receiver with the transmitter, whether the transmitter is transmitting at a clock rate as short as 74 milliseconds or as long as 86 milliseconds.

Chips U6 and U7 (FIG. 4) are conventional 555 timers. The reset pin 4 on each chip is tied to pin 5 of chip U4. This pin is normally low, and goes high only when the second one-shot on chip U4 fires. Thus until a valid start pulse has been recognized and the second one-shot fires, the two timers are held reset. Only following detection of a valid start pulse do the reset inputs of chips U6 and U7 go high, thus allowing them to be fired. Waveform 2 in FIG. 6 is the output of the first one-shot multivibrator on chip U4, at pin 4 (the negative true output). Thus waveform 2 is the inverse of waveform 1 (the transmitted pulse sequence), with the exception that when the start pulse is received pin 4 goes low for only 100 milliseconds rather than the actual 130-millisecond duration of the start pulse. The leading edge of each code pulse results in the firing of the first one-shot on chip U4, and the output pulse at pin 4 is terminated prematurely before 100 milliseconds have elapsed when the code pulse terminates—when output pin 12 of chip U3 goes low, this potential being applied to pin 3 of chip U4. The waveform at pin 4 of chip U4 is differentiated by capacitor C61 and resistor R41 (FIG. 4), the differentiated input being applied to the trigger pin 2 of timer U6. Waveform 3 on FIG. 6 shows the negative spikes which result from differentiating the waveform at pin 4 of chip U4, such a negative spike occurring at the beginning of the start pulse and also at the beginning of each code pulse. As will be described below, only the spikes at the start of each code pulse trigger timer U6. Waveform 6 on FIG. 6 illustrates the potential at output pin 3 of timer U6. The leading edge of each code pulse triggers the timer and causes a 74-millisecond pulse to be generated. As will be described below, at the end of each 74-millisecond pulse when pin 3 of chip U6 goes low, a negative step is applied to pin 2 of timer U7. This negative step causes timer U7 to generate a pulse at its output pin 3 for 12 milliseconds, this being shown in waveform 7 of FIG. 6.

It will thus be seen that pin 3 of chip U7 remains high starting 6 milliseconds before the expected arrival of the leading edge of the next code pulse, and it remains high for 6 milliseconds after this expected arrival. If the leading edge of the next code pulse actually arrives during this 12-millisecond "window", the circuit takes no action and code pulse recognition proceeds as described above. But if the leading edge of a code pulse arrives more than 6 milliseconds before it should (relative to the 80-millisecond time frame) or more than 6 milliseconds later than it should, the leading edge of the code pulse falls outside the 12-millisecond window determined by chip U7. The circuit senses this condition and utilizes the differentiated leading edge of the code pulse to reset decoder chip U3. The code recognition sequence is aborted, and another sequence will not resume until another valid start pulse is detected.

If a code pulse is received on time, within a respective window shown in waveform 7 of FIG. 6, its leading edge reflected at pin 4 of chip U4 (waveform 2 of FIG. 6) triggers chip U6 once again (waveform 6). This results in the triggering of chip U7 74 milliseconds later, and the creation of yet another window for the expected arrival of the next code pulse.

This technique avoids the accumulation of timing errors. It is each code pulse which in effect starts a new time frame in the receiver; the next code pulse must arrive 74–86 milliseconds later. The receiver operates in a synchronous fashion, there being synchronization not to the entire transmitted waveform but rather to each individual code pulse. Thus a check that each code pulse begins within 74–86 milliseconds of the start of the preceding code pulse is possible, without any concern being given to the fact that even with a transmitter which is operating as designed, the cumulative error may be much greater than ±6 milliseconds.

It is the leading edge of each code pulse which results in the firing of timer U6, and it is the termination of each pulse from chip U6 that triggers timer U7 and thus sets up the 12-millisecond window for the leading edge of the next code pulse. But there is no code pulse which precedes the first one, and thus an alternate mechanism is provided for triggering chip U7 directly, prior to receipt of the leading edge of the first clock pulse. It is actually the trailing edge of the start pulse which directly fires chip U7, as will be described below, the circuits accomplishing this including gates IC6A and IC6B (arranged as an R/S latch), and gates IC6C and IC7B.

A more detailed description of the circuit operation now follows. Waveform 3 on FIG. 6 shows the differentiated pulses which are applied to trigger pin 2 of chip U6, the waveform showing only the negative spikes of the differentiated waveform at pin 4 of chip U4 (waveform 2). The first spike is caused by the arrival of the leading edge of the start pulse. This spike cannot trigger timer U6 because chip U4 has not yet recognized the start pulse and its output pin 5 is low. Waveform 4 on FIG. 6 illustrates the output at pin 5, the pulse generated by the second one-shot on chip U4. Since pin 5 of chip U4 is connected to the reset input (pin 4) of chip U6, the latter chip cannot fire until after the start pulse has been recognized and the second one-shot on chip U4 has fired.

Following recognition of the start pulse, pin 5 of chip U4 goes high and thus allows chips U6 and U7 to fire.

It will be noted that pin 5 of chip U4 is also connected to one input of gate IC6B. As long as pin 5 is low in potential, the output of gate IC6B is high, and the output of gate IC6A is low. Waveform 5 on FIG. 6 depicts the potential at the output of gate IC6B; since gates IC6A and IC6B are arranged in the configuration of an R/S latch, the waveform is referred to as "latch". Initially, since pin 5 of chip U4 is low, the output of the latch is high.

The received signal (waveform 1 on FIG. 6) appears at pin 12 of chip U3 and is coupled through diode CR10 to one input of gate IC6A. At the trailing edge of the start pulse, when pin 12 of chip U3 goes low, the output of gate IC6A goes high and the output of gate IC6B goes low, as shown in waveform 5. The negative step at the output of gate IC6B is differentiated by capacitor C65 and resistor R47. The negative spike is applied to one output of gate IC6C, whose output now goes high. Since the output of this gate is connected to the inputs of gate IC7B, the output of the latter gate goes low and triggers chip U7. Thus the 12-millisecond window is generated as shown in waveform 7 of FIG. 6, preparatory to the leading edge of the first code pulse.

With timer U7 operating, pin 3 is high and the output of gate IC7C is low. This disables gate IC6D whose output remains high. The other input to this gate is derived from pin 5 of chip U4. During the start pulse, this pin is low so that it completely disables the operation of gate IC6D whose output remains high. Gate IC6D is allowed to reset the decoder chip U3 by pulsing its output low only after the start pulse has been verified and pin 5 of chip U4 (the positive true output of the second one-shot) is high.

As long as the leading edge of each code pulse occurs during a window in waveform 7 of FIG. 6 (while pin 3 of chip U7 is high), the output of gate IC6D remains high and the decoder chip is not reset. However, if the leading edge of the first code pulse or any succeeding code pulse arrives too early or too late, the resulting negative spike at the junction of capacitor C61 and resistor R41 causes the output of gate IC7C to go high. The input of this gate connected to pin 3 of chip U7 is now low (as is the input which is connected to the output of gate IC7A, to be described below), and it is only the lowermost input of gate IC7C which can maintain its output low. As soon as the lowermost input goes low, all three inputs are low and the output goes high. Gate IC6D now generates a negative step at its output which is transmitted through diode CR11 to the $\overline{RST}$ conductor which thus results in the resetting of decoder chip U3. The code recognition sequence is terminated, and for the sequence to begin again it is necessary for another start pulse to be detected.

This process continues with the leading edge of each code pulse triggering timer U6 as described above to generate a 74-millisecond pulse at chip U6. The trailing edge of the pulse is differentiated by capacitor C64 and resistor R44 to apply a negative spike to one input of gate IC6C. The positive output of the gate is inverted by gate IC7B to apply a negative step to the trigger input (pin 2) of chip U7, thus generating the next 12-millisecond window. The leading edge of each code pulse is ignored (insofar as gate IC6D is concerned) if it occurs during the 12-millisecond window generated by chip U7. The system is reset only if the leading edge of any code pulse falls outside the respective window. Even wide variations in the clock rate of the transmitter are possible without a loss in synchronization because chip U6 is triggered by the leading edge of each code pulse without regard to the overall timing. The waveforms of FIG. 6 show four code pulses arriving in the proper time frames, but the fifth code pulse is shown arriving 87 milliseconds after the fourth—with the leading edge of the code pulse being late and outside the ±6-millisecond tolerance. The last negative spike in waveform 3 thus falls outside the fifth window in waveform 7. This spike is extended through gates IC7C and IC6D, and diode CR11 to the decoder, and it resets without generating a positive potential at pin 9, i.e., a valid code pulse sequence has not been recognized.

Resistor R43, capacitor C63 and potentiometer R42 control the duration of the pulse generated by timer U6, and resistor R45 and capacitor C66 control the duration of the window pulse generated by timer U7. (The width of the pulse generated by timer U6 is adjustable so that it can be factory-set to 6 milliseconds less than the time interval between successive code pulses generated by the transmitter.) Resistors R43 and R45 are close-tolerance metal film resistors, and capacitors C63 and C66 are close-tolerance polycarbonate capacitors, all chosen for their low variations with temperature.

Once a valid code sequence is recognized and the output of transistor Q4 (FIG. 5) goes low, the low potential is applied through resistor R48 to the inputs of gate IC7A (FIG. 4). The output of the gate thus goes high to hold the output of gate IC7C low and the output of gate IC6D high. In effect, during the balance of the second one-shot multivibrator pulse (chip U4), diode CR11 is reverse biased and the decoder chip cannot be reset. This safeguard is provided to insure that once a valid code pulse is recognized, output transistor Q4 remains on for about 350 milliseconds without any danger that system noise will reset the decoder chip before the second multivibrator has timed out and thus possibly abort any required action by the logic circuit.

FIGS. 7-9, with FIG. 7 being placed to the left of FIG. 8 and with FIG. 9 being placed to the right, depict the logic portion of receiver/logic unit.

The logic circuit includes 17 terminals, each shown by a circle with a number within it, which are brought out to a terminal block (not shown) for connection to various parts of the electrical system of the vehicle. In addition, there are two conductors RCR1 and RCR2, which are extended to the receiver circuit just described. The following is a brief description of the connections made to the logic circuit:

Terminal 11—This terminal is connected to the vehicle battery. The battery potential applied at terminal 11 causes current to flow through diode D1 to charge capacitor C71. The resulting potential V+ is that used to power the logic chips in the system. Capacitor C71 provides low-frequency noise immunity and capacitor C72 provides high-frequency noise immunity. Similarly, diode D2 and capacitors C74 and C75 develop a B+ potential which is used to power relays K1, K2 and K3 on FIG. 9. Two separate supplies are provided, as is known in the art, so that the power supply for the logic is not affected by the relatively large currents which may be drawn by the relays; otherwise, some of the logic circuits might enter into incorrect states. It should be noted that the car battery potential at terminal 11 is extended over conductor RCR1 to the receiver, the receiver being provided with its own regulator circuit.

Conductor RCR1—This conductor extends the 12-volt battery potential directly to the receiver circuit.

Conductor RCR2—This conductor is caused to go low by the receiver circuit for approximately 350 milliseconds whenever a valid code pulse sequence is detected.

Terminal 5—This terminal is connected in a conventional manner to the ignition system; it is normally grounded but is high in potential whenever the ignition key is turned on.

Terminal 7—This terminal is connected to any conventional sensor in the vehicle which develops a ground signal when the car is tampered with; for example, a switch may be provided in the trunk which provides a ground potential to terminal 7 when the trunk is opened. The terminal is referred to as the "Ground Alarm" because the application of a ground potential to it results in triggering of the alarm.

Terminal 6—This terminal is referred to as the "+12-volt Alarm" and it is similarly connected to sensors, switches, etc. which may be placed in the vehicle. When battery potential is applied to this terminal, the alarm is triggered.

Terminals 1 and 2—These terminals are connected to the two ends of one of the speakers of a stereo pair. As will be described below, two stereo speakers, which are commonplace in today's automobiles, are used to detect tampering with the vehicle. The speakers actually act as microphones and develop a signal across their respective voice coils. The two ends of the coil of one speaker are coupled to terminals 1 and 2.

Terminals 3 and 4—These two terminals are connected to the ends of the voice coil of another of the speakers in the stereo pair.

Terminal 9—This terminal is connected to the ground line of the overall electrical system of the vehicle.

Terminals 12 and 13—These terminals are connected to the horn such that whenever the contacts of relay K1 are closed, the horn is sounded.

Terminals 8 and 10—These terminals are connected to the vehicle lighting system such that when the contacts of relay K2 close, the lights turn on. Preferably, the connection is made to the parking lights.

Terminals 15, 16 and 17—Terminal 15, and one of terminals 16 or 17, are connected to any portion of the electrical system of the vehicle which disables the vehicle when relay K3 is operated. For example, terminal 15 may be connected to the system ground and terminal 16 may be connected to the distributor points, the points thus being grounded whenever relay K3 is operated and the vehicle is to be disabled from operating. The normally open contacts of relay K3 disconnect terminals 15 and 16 from each other so that only if the system is armed with relay K3 operated is the vehicle disabled. Alternatively, in a diesel engine terminals 15 and 17 may be connected within the line going to the starter solenoid, or they may be connected within the line which controls the fuel pump in a fuel injected vehicle. As long as relay K3 is not operated and the normally-closed contacts are closed, terminals 15 and 17 comprise a short circuit and do not disable the vehicle operation. But when relay K3 operates, the two terminals are disconnected from each other and the vehicle is disabled.

Terminal 14—This "accessory" terminal may be connected to an accessory device for controlling any desired operation. In the illustrative embodiment of the invention, it is connected to the door-lock circuit. Whenever transistor Q7 turns on to disable vehicle operation (by operating relay K3), the ground potential which is extended through the transistor and appears at terminal 14 causes the door locks to lock. Conversely, when transistor Q7 is first turned off, the positive potential from the B+ supply which appears on terminal 14 causes the door locks to unlock.

A general description of the logic circuit will first be presented. It will be assumed that the system is disarmed. Three sequences will be described—arming of the system when a first proper code sequence is recognized, generation of an alarm if an intruder tampers with the system, and disarming of the system when a second proper code sequence is recognized.

When the first code sequence is recognized, the operator desiring to arm the system, a ground signal appears on conductor RCR2 (FIG. 7). Gate IC1A thus applies a positive potential to the clock input of flip-flop IC3A; the Q output of the flip-flop goes high to indicate that the system is armed. Inverter IC4C, gates IC4D, IC1D and IC5B, and the connected circuit elements cause transistor Q5 to turn on momentarily twice in succession, thus causing relay K1 to energize twice. The resulting two horn beeps provide aural verification that the system is now armed. If switch S3 has been opened by the operator (the switch appearing on the housing of the receiver/logic unit, not shown), the signal path is broken and there is no horn-beep verification; the system thus may be armed silently.

The output of inverter IC4C is also routed through gates IC1C and IC5C to the base of transistor Q6. The transistor turns on momentarily and relay K2 operates, thus causing the lights to flash once to indicate that the system has been armed.

The $\overline{Q}$ output of flip-flop IC3A is now low and inverter IC5D applies a positive potential to the base of transistor Q7. The transistor turns on and relay K3 operates—e.g., to disable the vehicle ignition system as described above, and also to operate an accessory device if desired (the door locks in the illustrative embodiment of the invention).

An alarm sequence may be initiated in one of three ways. As described above, any ground signal applied to terminal 7 or any battery signal applied to terminal 6 is an indication that the vehicle is being tampered with. Similarly, if there is a large amount of noise or vibration, the speaker coils will develop potentials across them, which potentials are amplified by amplifier IC2A. Comparator IC2B detects any one of the three conditions and triggers the alarm signal.

The high potential at the output of comparator IC2B allows amplifier IC2D to begin oscillating. The output of this amplifier is extended through gates IC5B and IC5C to transistors Q5 and Q6 to thus control simultaneous flashing of the lights and beeping of the horn. After approximately 45 seconds, the circuitry associated with amplifier IC2C senses the discharge of capacitor C87 and terminates the alarm signal. The system is returned to its stable state, waiting for another alarm sequence to begin. If the system registers another alarm input, the cycle repeats—with the horn beeping and the lights flashing for another 45 seconds. Thereafter, the system will again reset and wait. The sequence will be repeated as many times as there are alarm inputs. During the entire sequence, relay K3 is still operated and the ignition system of the vehicle is disabled.

When the operator returns to his car and operates the transmitter, the low potential on conductor RCR2 is once again extended through gate IC1A to the clock input of flip-flop IC3A. The Q output of the flip-flop now goes low. The low potential is extended through gates IC4C, IC1D and IC5B to control a single beep of the horn to provide aural verification that the system has been disarmed (assuming that switch S3 is closed).

The same input pulse on conductor RCR2, after transmission through gate IC1A, is applied to the clock input of flip-flop IC3B whose Q output now goes high. This enables the "flasher circuit" comprising gates IC1C and IC5C to continuously cause transistor Q6 to turn on and off. At the same time, transistor Q7 turns off so that the ignition switch is no longer disabled and the door locks unlock. Also, with the Q output of flip-flop IC3A now high, the alarm sensing circuit is disabled so that even if there is noise or vibration, or a ground or positive potential applied to one of terminals 6 or 7, the alarm is not triggered.

When the operator enters the vehicle and turns on the ignition, the battery potential at termnal 5 is coupled through gates IC1B and IC4A to the reset input of flip-flop IC3B. The flip-flop resets and thus stops the lights from flashing. In addition, turning on the ignition disables gate IC1A from responding to negative pulses on conductor RCR2; thus the unit cannot be armed or disarmed whenever the ignition is on. (This is a safety precaution—as the user is driving the vehicle, an inadvertent operation of the transmitter should not turn off the ignition.)

Turning now to a description of the detailed operation of the system, switch S2 (FIG. 7) is the master input switch which overrides all other inputs. Typically, switch S2 is a key-operated switch on the receiver/logic unit housing. If the switch is closed, the input of inverter IC5A is grounded and the high potential applied at the output of inverter IC5A to the reset input of flip flop IC3A holds this flip flop reset with the Q output low. Similarly, the high potential at the output of inverter IC5A is inverted by NOR gate IC1B, and the low potential thus applied to an input of gate IC4A results in a high potential being applied to the reset input of flip-flop IC3B whose Q output also remains low. In such a state, the system remains inoperative—the lights are not caused to flash, the horn is not caused to beep, and the vehicle is not disabled.

When switch S2 is first turned on (the position shown in FIG. 7), capacitor C73 charges through resistor R59. After approximately 0.1 second, the output of inverter IC5A goes low to disable the reset input of flip-flop IC3A. Similarly, the low potential at the output of inverter IC5A results in a high potential at the output of gate IC1B, and a low potential at the output of gate IC4A; thus the "light control" flip-flop IC3B has its reset input held low so that it can switch state when its clock input is triggered.

If the ignition system of the vehicle is turned on, a positive potential is applied to terminal 5 to hold the output of gate IC1A low. Thus negative pulses on conductor RCR2 have no effect on the output of gate IC1A. (Similarly, the output of gate IC1B is held low.) But if the ignition is off, ground potential is extended to one input of gate IC1A so that its output is the inverse of the potential on conductor RCR2. The first detection of a pulse code results in a positive step appearing at the clock input of flip-flop IC1A. The Q output assumes the state of the D input, and since the D input is coupled to the $\overline{Q}$ output, the flip-flop switches state. Since the flip-flop was initially reset with the $\overline{Q}$ output being high, the Q output now goes high to arm the system. It should be noted that the positive step at the output of gate IC1A is also coupled to the clock input of flip-flop IC3B. However, the D input of this flip-flop is connected to the Q output of flip-flop IC3A which is initially low. Thus the Q output of flip-flop IC3B remains low.

At the same time that the Q output of flip-flop IC3A goes high, the $\overline{Q}$ output goes low. This causes capacitor C83 to start charging through resistors R70 and R71. (Resistors R70, R72, R73 and R74 prevent large charging or discharging currents through capacitors C83, C84, C85 and C86 from entering the integrated circuits and causing damage.) The negative step transmitted through the capacitor to the input of inverter IC4C causes the output of the inverter to go high, and to remain high for approximately 0.6 second until capacitor C83 charges. The positive pulse at the output of the inverter is extended through one input of NOR gate IC1C whose output, connected to an input of gate IC5C, goes low. The other input of gate IC5C is normally high, as will be described below. When the input connected to the output of gate IC1C goes low, the output of gate IC5C goes high to turn on transistor Q6. Thus for 0.6 second the transistor turns on and current flows through the coil of relay K2. The relay contacts close and the lights flash. At the termination of the pulse at the output of inverter IC4C, transistor Q6 turns off, and the current in the coil of relay K2 dissipates through diode D11.

When the output of inverter IC4C first goes high, a positive pulse is extended through capacitor C86 to an input of gate IC1D. The output of the gate thus goes low until capacitor C86 charges through resistors R74 and R77, which charging takes approximately 0.3 second. The 0.3-second negative pulse at the output of gate IC1D is extended through switch S3 to one input of gate IC5B, the other input of which is normally held high. Thus the output of gate IC5B goes high for 0.3 second to turn on transistor Q5. Relay K1 operates to control beeping of the horn. (Capacitor C89 across terminals 12 and 13 is provided in order to suppress arcing.)

At the end of the 0.6-second pulse at the output of inverter IC4C, a negative step is transmitted through capacitor C84 to one input of gate IC4D. The output of the gate goes high and remains high until capacitor C84 charges, which charging takes approximately 0.3 seconds. Thus a positive 0.3-second pulse is applied from the output of gate IC4D to the second input of gate IC1D. Just as the 0.3-second pulse transmitted through capacitor C86 causes a horn beep, so does the pulse derived from gate IC4D. The horn thus beeps twice during arming verification. (As will be described below, it beeps only once during disarming verification, so that there is a difference in the two "sounds".) It is thus apparent that the leading edge of the 0.6-second pulse at the output of inverter IC4C results in the triggering of the first 0.3-second horn beep through capacitor C86, and the trailing edge of the same pulse results in the triggering of the second horn beep through capacitor C84.

The low potential at the $\overline{Q}$ output of flip-flop IC3A is inverted by inverter IC5D to turn on transistor Q7. This transistor remains on. When the potential at pin 14 first goes low, the door locks are locked. In addition, with transistor Q7 on, relay K3 is operated to disable operation of the vehicle as described above.

The high potential at the Q output of flip-flop IC3A, in addition to controlling flashing of the lights and the doublebeep of the horn, initiates the arming sequence for the alarm. As long as the flip-flop is reset, with the Q output low, resistor R78 is returned to ground potential. Since resistors R78 and R79 are equal in magnitude, the cathode of diode D8 is held at approximately half the supply voltage. Capacitor C87 charges from the positive potential at the output of amplifier IC2D through resistor R80. The capacitor charges to slightly above half the supply potential (12 volts), by an amount equal to the voltage drop across diode D8. The positive input of operational amplifier IC2C is returned to V+ through resistor R81, and the negative input is connected to the junction of diode D8 and capacitor C87. When the system is reset, the potential at the positive input is greater than that at the negative input, and the output of the operational amplifier is high. Diode D9 conducts and the negative input of operational amplifier IC2B is held close to 12 volts. The circuit is designed so that no combination of inputs (terminals 1–4, 6 and 7) can cause the positive input of amplifier IC2B to become higher in voltage than the voltage at the negative input, the output of operational amplifier IC2B remains low, and the system therefore ignores all alarm inputs.

However, when the system is armed and the Q output of flip-flop IC3A goes high, resistor R78 is returned to 12 volts, rather than to ground. Capacitor C87 is thus allowed to charge up to the supply voltage. Resistor R80 is large in magnitude and it requires approximately 6 seconds for the voltage across capacitor C87 to rise to the level of the voltage at the plus input of operational amplifier IC2C. (Resistors R81 and R82 set the voltage at the positive input at approximately $\frac{2}{3}$ of the supply voltage.) During these 6 seconds, the horn is beeping twice, indicating that the system has been armed. Since the output of amplifier IC2C remains high, it prevents the accidental setting off of the alarm from the noise of the horn beeping; diode D9 remains conducting and the output of operational amplifier IC2B remains low. It is only after about 6 seconds that the output of amplifier IC2C goes low and diode D9 turns off.

In the prior art, a single car speaker has been used as an intrusion sensor with the speaker cone acting as a microphone and generating a signal across the speaker coil. But most vehicles today are equipped with stereo systems and if a single speaker is utilized in this fashion, one side of the vehicle will be more sensitive to intrusions than the other. If the sensitivity of the alarm is adjusted to detect an intrusion on the non-speaker side of the car, the speaker side of the car may then be extraordinarily sensitive and this may result in false alarms. The circuitry shown in FIGS. 7 and 8 not only allows stereo systems to be hooked up, thus solving the different-sensitivity problem, but it also allows hook-ups to the newer, more powerful car radios employing bridged-type outputs (two out-of-phase drivers connected to opposite sides of the speaker voice coil). Resistors R57 and R58 provide ground returns for such speakers. Resistors R55 and R56 mix the "stereo" signals from the "hot" sides of the two speakers to provide a single output, an output which is the "average" of the signals generated across the two speaker coils so that neither side of the vehicle is more sensitive to intrusions than the other. The circuit arrangement also in no way disturbs normal stereo reception.

Capacitor C79 filters out undesirable high-frequency noise. The mixed speaker signal is extended through capacitor C80 and resistor R61 to the negative input of operational amplifier IC2A. This amplifier, with its associated components, comprises a variable gain inverting amplifier. Capacitor C82 by-passes high-frequency noise, and potentiometer R63 serves to vary the gain of the amplifier from a minimum of 1 to a maximum of approximately 50. This allows the circuit to accommodate the wide range of speakers found in current-day automobiles and their wide range of environments. (Whoever installs the system in the vehicle must adjust potentiometer R63 for proper sensitivity; typically, a hole in the receiver/logic unit housing may be provided so that a screwdriver may be inserted for turning potentiometer R63.)

Resistors R66, R67 and R68 form a voltage divider to generate two voltages. The potential at the junction of resistors R66 and R67 is approximately 200 millivolts higher than the potential at the junction of resistors R67 and R68. The potential at the junction of resistors R66 and R67 is bypassed by capacitor C90, and extended through resistor R62 to the positive input of operational amplifier IC2A. It is also bypassed by capacitor C81 to create a stable reference voltage at the positive input of the amplifier.

In the absence of a signal from the speakers, the output of amplifier IC2A is maintained very close to the voltage at the positive input. In the absence of a ground alarm at terminal 7, the voltage at the output of amplifier IC2A is extended through resistor R65 to the negative input of amplifier IC2B. The voltage at the junction of resistors R67 and R68 is extended through resistor R69 to the positive input, and assuming that there is similarly no 12-volt alarm signal at terminal 6, the positive input of amplifier IC2B is approximately 200 millivolts lower than the potential at the minus input. The output of amplifier IC2B, which is connected as a comparator, is thus low in the quiescent state.

If vibration is detected by either or both of the speakers, any positive-going signal is amplified by amplifier IC2A to a degree determined by the setting of potentiometer R63. The output of the amplifier drops in potential, and if the drop exceeds 200 millivolts the positive input of amplifier IC2B will be at a potential which is higher than that at the negative input. The output of the amplifier goes high and diode D6 conducts. The large positive potential now applied to the minus input of amplifier IC2A forces the amplifier output to remain low, amplifiers IC2A and IC2B thus operating as a latch. Similarly, a ground signal at terminal 7 (e.g., from a door switch) or a 12-volt signal at terminal 6 switches the state of amplifier IC2B, and similarly results in the latching effect. (Diodes D4 and D5 prevent a thief from applying a positive or ground potential respectively to terminal 7 or 6 for the purpose of holding the output of amplifier IC2B low, thus defeating the alarm-sensing circuit.)

When the output of amplifier IC2B goes high, the alarm sequence is initiated. The positive potential now applied through resistor R88 to the cathode of diode D7 causes the diode to turn off. Capacitor C88, which is normally held at about $\frac{1}{3}$ of the supply voltage, is now allowed to charge through resistor R87 from the supply voltage which is available at the output of comparator IC2D. When capacitor C88 rises in potential to a point above that at the junction of resistors R84 and R85, the output of comparator IC2D switches low. This forces the output of gate IC5B to go high, and thus transistor Q5 turns on and the horn beeps. The low potential at the output of comparator IC2D also forces the output of gate IC5C to go high, the turning on of transistor Q6 and the flashing of the lights.

As soon as the output of comparator IC2D goes low, capacitor C88 begins to discharge through resistor R87 into the output of the comparator. The comparator, together with capacitor c88, and resistors R85, R86 and R87, forms an oscillator which causes the horn to beep and the lights to flash on and off (approximately one second on and one second off) for as long as the oscillator is allowed to operate.

It will be recalled that capacitor C87 charges to the supply voltage when the system is first armed (after a delay of about 6 seconds so that the verification horn beeps do not trigger the alarm). But when amplifier IC2D starts to oscillate, its output switches between 12 volts and ground. When it is at ground potential, capacitor C87 discharges through resistor R80 into the output of comparator IC2D and the voltage across capacitor C87 falls. When the comparator switches to a high output, capacitor C87 charges once again through resistor R80. Thus the capacitor alternately switches through resistor R80 to effective supplies of 12 volts or ground potential. As long as the capacitor voltage exceeds 6 volts, each increment of discharge exceeds each increment of charge (since comparator IC2D oscillates with a 50% duty cycle). The voltage across capacitor C87 thus starts to fall. Since the positive input of amplifier IC2C is at about ⅔ of the supply voltage, the average voltage across capacitor C87 decreases until the potential at the negative input is greater. At this time, comparator IC2C changes state and its output returns to 12 volts. Diode D9 conducts once again and forces the output of amplifier IC2B to go low. Diode D6 thus stops conducting and eliminates the latch condition. In addition, diode D7 now conducts and discharges capacitor C88 to return the oscillator to its quiescent state. The entire system is thus returned to its quiescent state. It takes approximately 45 seconds for capacitor C87 to discharge to that level which causes comparator IC2C to change state, and thus the horn beeps and the lights flash for only 45 seconds following each alarm condition.

Resistor R83 provides a certain degree of hysteresis and controls a "dead band" between alarm cycles. When the output of comparator IC2C is high, the voltage at its positive input is slightly above 8 volts; when the output is low, the voltage at the positive input is slightly below 8 volts. When the system is first armed, capacitor C87 charges and the output of comparator IC2C switches low. The positive input goes to a potential below 8 volts. When an instrusion is sensed and the alarm is sounded, capacitor C87 starts to discharge. When its potential reaches that at the positive input, the comparator switches state, its output goes high, and the alarm circuit turns off. Since the comparator output is high, the system cannot detect an intrusion. Capacitor C87 now charges, starting from a level below 8 volts. Since the positive input of the comparator is at a level slightly above 8 volts, it takes about one second before capacitor C87 charges to the point at which the comparator output will switch back low. When this happens, the alarmsensing circuit will be enabled again, and if the alarm condition is still present the alarm will be sounded again. The one-second hysteresis delay allows the system to reset in the event there is no longer an alarm condition.

It should be noted that capacitor C87 functions in a dual capacity. First, it serves as an arming delay to make sure that the horn verification signal does not accidentally set off the alarm. Second, it acts as a timer to determine how long the alarm lasts after it is first triggered.

When the operator returns to his vehicle and operates the transmitter, a negative step is once again applied to the clock input of each of flip-flops IC3A and IC3B. The former flip-flop switches to the disarm state, with the Q output going low. But because the Q output was initially high, and this output is connected to the D input of flip-flop IC3B, the latter flip-flop is now set so that its Q output goes high.

When the Q output of flip-flop IC3A goes low, a negative step is transmitted through capacitor C85 to one input of gate IC4D. Until the capacitor charges through resistors R76 and R73, which charging takes about 0.3 seconds, the output of gate IC4D remains high and the horn is beeped. The single beep of the horn verifies that the system has been disarmed. Once again, if switch S3 is open, there is no aural verification. (However, opening of the switch has no effect on the horn beeping during the alarm sequence since the switch is not in the signal path for this sequence.)

When the Q output of flip-flop IC3B goes high, diode D13 is turned off and capacitor C91 starts to charge through resistor R96 to B+. When the capacitor voltage reaches a level sufficient to turn on gate IC1C, the output of gate IC5C goes high, and through resistor R97 latches the output of gate IC1C low. Transistor Q6 is now on so it discharges capacitor C91 through resistor R96. Because resistor R97 now returns a high potential, a voltage divider is set up with resistor R95, and capacitor C91 has to discharge to below the level which first operated gate IC1C before the gate output switches high once again. When it does switch, resistor R97 is returned to ground. Capacitor C91 starts to charge again, but it must now charge to the relatively higher level before the output of gate IC1C goes low because of the ground introduced through resistor R97. Resistors R95 and R97 thus provide hysteresis, and the overall arrangement is that of a Schmitt trigger which oscillates. Transistor Q6 alternately energizes and deenergizes relay K2, thus flashing the lights on and off. The lights flash on for about one second and then off for about one second, and do so continuously. This enables the operator to locate the vehicle in a parking lot, for example. The flashing of the lights is more effective than simply turning and leaving them on.

When the $\overline{Q}$ output of flip-flop IC3A first goes high at the instant of disarming, the output of inverter IC5D goes low. This causes transistor Q7 to turn off. Relay K3 releases so that the vehicle is no longer disabled, and the high potential at terminal 14 causes the door locks to unlock.

Inverter IC5A was described above as disabling the system when key switch S2 is closed. But the inverter also operates as a power-on reset. When battery potential is first applied to the system at terminal 11, diodes D1 and D2 conduct, and capacitors C71–C75 charge. If the key switch is open at this time, capacitor C73 starts to charge through resistor R59. Until the capacitor reaches approximately half the supply voltage, the output of inverter IC5A remains high and both of flip-flops IC3A and IC3B remain reset. In this way, whenever power is first connected to the system (e.g., when a battery is replaced, or when the system is first installed), the system is guaranteed to come on in a known state— disarmed, with the lights off. After capacitor C73 completes its charging toward the supply voltage through resistor R59 (after approximately 0.1 second), the output of inverter IC5A goes low, thus freeing the two flip-flops to respond to clock pulses.

Gate IC4B insures that the two flip-flops do not get out of sequence with one another. Flip-flop IC3A is the alarm control flip-flop, and flip-flop IC3B controls flashing of the vehicle lights during disarming verification (which also serves to locate the car). When the system is disarmed, the lights may be flashing (providing the car location function) or not flashing (the ignition system having been turned on, as will be described below). But when the system is armed, the lights should not be flashed under control of flip-flop IC3B (although they may be flashed as part of the alarm function). Gate IC4B makes sure that the two flip-flops do not get out of synchronization, that is, the system is armed, as controlled by flip-flop IC3A, the lights may not be flashed under control of flip-flop IC3B.

Should the system be armed, the Q output of flip-flop IC3A is high to enable one input of gate IC4B. If flip-flop IC3B is out of sequence, its Q output will be high, thus enabling the other input of the gate. The gate output goes low, forcing the output of gate IC4A to go high. This, in turn, resets flip-flop IC3B to its correct state, with the Q output low.

After disarming the system, the operator may enter the vehicle, insert the ignition key and turn on the ignition. This accomplishes two things. First, the high potential at terminal 5 causes the output of gate IC1B to go low, which in turn causes the output of gate IC4A to go high. Flip-flop IC3B is reset to extinguish the flashing lights. Second, as described above, the high potential extended to an input of gate IC1A forces its output to remain low, thus preventing the system from responding to any negative pulses appearing on conductor RCR2. This is a safety feature to prevent accidental shutting off of the engine should the transmitter be operated inadvertently while the vehicle is being driven.

Figure 10:
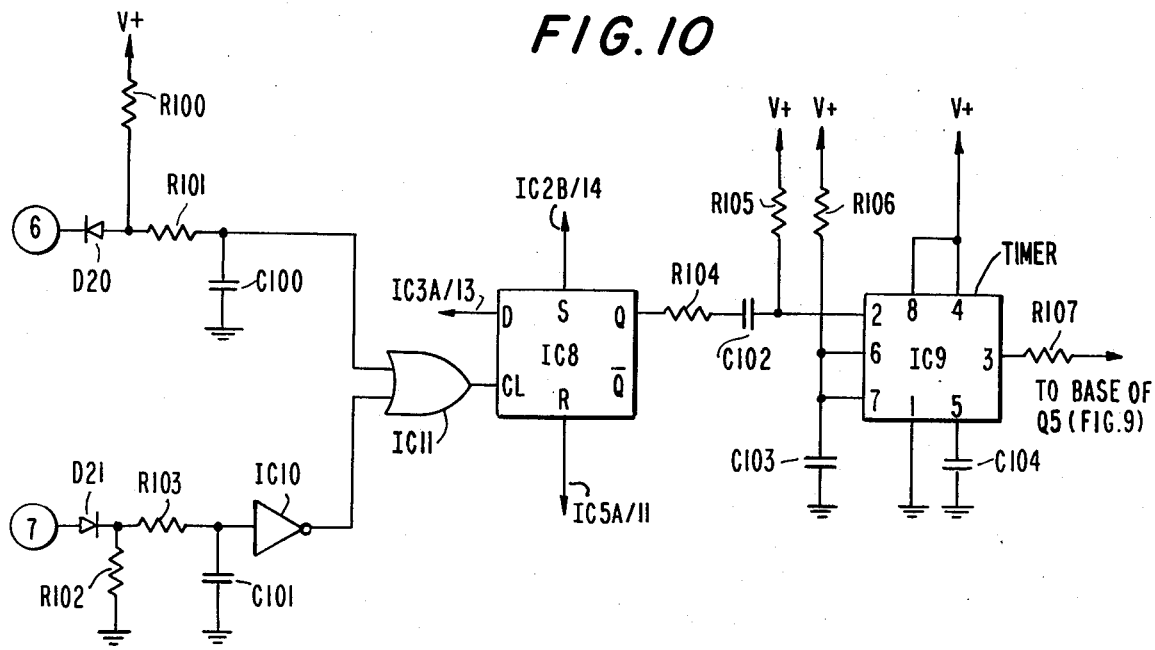
FIG. 10 is the schematic of an "add-on" circuit for FIGS. 7-9 which adds the "disturbance warning" feature to the overall system (this feature being that described above which controls beeping of the horn when the driver opens a door in the event an alarm was sounded during his absence)

When the circuit of FIG. 10 is added to that of FIGS. 7-9, the overall unit warns the operator, upon his return to the vehicle, that the alarm was activated in his absence. When the operator opens a door, the horn beeps—but only if there was a disturbance in his absence.

Flip-flop IC8 is a D-type. The reset input of the flip-flop is connected to pin 11 of inverter IC5A (FIG. 7); pin 11 is the output of the gate. Thus when power is first applied to the system and the output of inverter IC5A goes high, flip-flop IC8 is reset. This is simply a safety precaution; with the flip-flop reset, the horn cannot beep after disarming when the door is opened.

Flip-flop IC8 is set, to indicate that a disturbance has occurred, when its set input goes high. The set input is connected to pin 14 of comparator IC2B (FIG. 8), this pin being the comparator output. It will be recalled that whenever an alarm condition exists, the output of comparator IC2B goes high. In such a case, flip-flop IC8 is set. The flip-flop can be set only if the system is armed and only if a disturbance then occurs, inasmuch as these are the two necessary conditions for the output of comparator IC2B to go high. Although multiple disturbances may occur during the operator's absence, all it takes is at least one for flip-flop IC8 to be set.

When the system is disarmed, flip-flop IC3A (FIG. 8) is reset and its Q output (pin 13) goes low. This pin is connected to the D input of flip-flop IC8. The state of flip-flop IC8 does not change when its D input goes low since the flip-flop switches state only when its clock input is pulsed. When any door of the vehicle is opened by the operator, however, a positive pulse is applied to the clock input.

Terminals 6 and 7 (FIG. 7) are the terminals to which 12-volt and ground potentials are applied when one of the vehicle sensors detects a disturbance condition. Included among the several sensors which may be equipped in the vehicle are sensors which detect the opening of the doors. What is necessary in the circuit of FIG. 10 is to derive a positive pulse at the input of OR gate IC11 when one of the doors is opened. Thus diode D20 is connected to terminal 6 if the opening of a door results in the application of a 12-volt potential to this terminal, and/or diode D21 is connected to terminal 7 if the opening of a door results in the application of a ground signal to this terminal. If diode D20 is connected to normally-grounded terminal 6, the diode normally conducts to apply a low potential to the upper input of gate IC11. But when a door is opened and a positive potential is applied to terminal 6, the diode is reverse-biased, and the positive V+ potential is extended through resistors R100 and R101 to gate IC11. (Resistor R101 and capacitor C100 comprise a conventional noise-suppression circuit.) In such a case, the output of gate IC11 goes high. Similarly, if diode D21 is connected to terminal 7 which is normally high in potential, the diode conducts and the output of inverter IC10 is low. When a ground potential appears at terminal 7, however, the diode is reverse-biased and the output of inverter IC10 goes high, similarly resulting in a positive pulse at the output of gate IC11. (Resistor R103 and capacitor C101 are again a noise suppression circuit.) In either case, a clock pulse is applied to flip-flop IC8, and the low potential at the D input now causes the Q output to go low.

Chip IC9 is a conventional 555 timer which is triggered when a negative step is applied to its input at pin 2. While flip-flop IC8 is set, following a disturbance signal, its Q output is high and has no effect on chip IC9. But as soon as a door is opened and the Q output goes low, a negative step is applied to the trigger input of the timer. Its output at pin 3 now goes high. The circuit components are such that a 0.25-second pulse is generated. The output of the timer is extended through resistor R107 directly to the base of transistor Q5 on FIG. 9. Thus transistor Q5 turns on momentarily to beep the horn. The timer then times out and returns to its quiescent condition. Also, flip-flop IC8 is in its normal reset state with the Q output low. Following arming of the system and the appearance of a disturbance signal, resulting in the output of comparator IC2B (FIG. 8) going high, the flip-flop will be set once again and the circuit will function as described. In the absence of a disturbance signal, flip-flop IC8 remains reset, a negative step does not appear at the output when a door is opened because the flip-flop does not change state, and the horn is no beeped.

The horn will be beeped for 0.25 second only if four things happen in sequence: the system must first be armed and the vehicle must then be disturbed, following which the system must be disarmed and a door opened. The short beep is long enough to be clearly heard, yet short enough so as not to be an annoyance. For deaf drivers, it is possible to provide a warning light in lieu of, or in addition to, the horn beeping circuit, the light also being controlled by the positive pulse which appears at the output of chip IC9.

Referring to FIG. 9, it will be recalled that if switch S3 is opened, the horn is not beeped to provide arming and disarming verifications; only the lights flash. Whenever the system is armed or disarmed by operating the transmitter, the output of comparator IC2D remains high and one input of gate IC5B is energized. The other input of the gate is connected through resistor R89 to V+, and consequently the output of gate IC5B would remain low to hold transistor Q5 off in the absence of the output of gate IC1D going low. But the output of this gate is pulsed low, once or twice, to control horn verification, the low potential being extended through switch S3 to gate IC5B whose output is pulsed high. The opening of the switch thus disables the horn from beeping following arming or disarming. As explained above, the switch may be opened in order that the verification be silent, for example, if a driver returns home late at night and does not wish to disturb those people who may be sleeping. But switch S3 is on the housing of the receiver/logic unit which is preferably not mounted in the passenger compartment of the vehicle. Thus it may be inconvenient for the user to open the switch (or to close it when he wishes to re-establish horn verification). It is, of course, possible to extend a wire connection from the receiver/logic unit to a switch which is installed in the passenger compartment, but this leads to extra expense and effort. The circuit of FIG. 11 allows the operator to effect operations which are the equivalents of opening and closing switch S3 simply by manipulating the ignition switch.

The circuit of FIG. 11 is added to the system of FIGS. 7-9 as follows. One input of gate IC12A is connected to the output of gate IC1B (FIG. 7); it will be recalled that the output of gate IC1B is low whenever the ignition is turned on or when power is first applied to the system. One input of gate IC12C on FIG. 11 is connected to the cathode of diode D3. This point is at battery potential whenever the ignition is on.

Switch 33 (FIG. 9) is shown in the dashed box on FIG. 11 to indicate that when the optional circuit of FIG. 11 is used, the switch is not utilized; instead, one input of gate IC13 on FIG. 11 and the gate output are connected in place of the switch between pin 11 of gate IC1D and pin 1 of gate IC5B, respectively.

Gates IC12C and IC12D are arranged in the configuration of a conventional R/S latch. When the ignition switch is first turned on, the input of gate IC12C goes high to reset the latch, with the output of gate IC12C going low and remaining low. Gates IC12A and IC12B are arranged in the configuration of a one-shot multivibrator whose period is about two seconds. When the output of gate IC1B first goes low with the turning on of the ignition switch, the one-shot is triggered and the output of gate IC12B goes high and remains high for two seconds—even if the ignition switch is turned off within those two seconds. With a high potential extended to one input of gate IC12D, its output goes low. This has no effect on the operation of gate IC12C, however, as long as its other input is held high by the ignition staying on. As long as the ignition is maintained on, the operation of the one-shot has no effect on the R/S latch. The output of gate IC12C remains low since the latch is held in the reset state by the ignition-on signal even during the period of the multivibrator. After the multivibrator times out, the output of gate IC12C remains low. The output of gate IC13 thus follows the ignition-on signal, and the horn-beep verification operation is preserved.

However, if the ignition is turned off before the two-second timing period has elapsed, the input of gate IC12C goes low. The low output at gate IC12D which is coupled to an output of gate IC12C now causes the output of this latter gate to go high. In effect, the R/S latch is set, and it remains set after the two-second pulse from the one-shot has expired. Even though the output of gate IC1D goes low once or twice for verification purposes when the transmitter is operated, the output of gate IC13 remains high and thus prevents the horn from beeping. Thus the horn can be silenced during the verification sequence simply by turning the ignition on and then off within two seconds.

Thus if the driver turns off the ignition of the vehicle in the usual way, without then turning it on for less than two seconds, the output of the R/S latch remains low and the horn verification feature is not disabled. When the driver arms the system by operating the transmitter, the horn will beep in the usual way, and it will also beep when he disarms the system upon his return. But if after he turns the ignition off, he turns it on momentarily, the output of the R/S latch will be switched high, and the horn will not beep upon arming or disarming of the system.

The next time that the ignition is turned on for more than two seconds, for example, when the driver returns to the vehicle and drives off, the R/S latch is reset in the usual way and the horn verification feature is automatically restored. Thus after any operation of the vehicle, the horn beep will be heard following arming or disarming. This "automatic" restoration of the horn-beep verification feature is desirable because this is the normal way in which the system indicates arming or disarming. If the user wants to disable the horn-beep feature, he must turn the ignition on momentarily, after he first turns it off, following which the aural verification feature will be disabled until the ignition is once again turned on for more than two seconds.

Although in the context of FIG. 11 the ignition switch is used to disable horn beeps, the ignition-controlled technique is not limited to this particular aspect of the overall operation of the automobile security system. In general, operating the ignition switch in a predetermined manner, e.g., turning it on and then off within a predetermined time period, can be used to change any desired mode of operation of the receiver/logic unit. Other aspects of the operation may be controlled in this manner, and not only the horn-beep verification feature. It is even possible to change two or more aspects of the operation depending on how long the ignition is left on before it is turned off. For example, turning the ignition off within two seconds might modify one mode of operation (e.g., horn beeps), but leaving it on for more than two seconds but less than five might modify another (e.g., door locks or alarm).

The circuit of FIG. 12, which controls locking and unlocking of the vehicle door locks when the system is respectively armed and disarmed, is added to the receiver logic simply by connecting the anode of diode D22 to the B+ source and connecting switch S4 to accessory terminal 14 (FIG. 9). It will be recalled that this terminal is normally at the B+ potential when the system is disarmed, but is grounded by transistor Q7 whenever the system is armed.

Conductor 52 is connected to the "common" lead of a conventional door lock circuit (not shown). Conductor 50 is connected to any point in the conventional circuit which will control locking of the door locks when the common wire 52 is connected to conductor 50 by operation of relay K4. Similarly, conductor 40 is connected to any point in the circuit which will control unlocking of the door locks when conductor 40 is connected to common wire 52 upon the operation of relay K5. The circuit of FIG. 12 operates to energize one of relays K4 or K5 for a fraction of a second when the system is first armed or disarmed.

Switch S4, if included in the system, appears on the receiver housing and simply allows the automatic locking/unlocking operation to be disabled. Resistor R115 is provided to prevent ambiguous operation in the absence of an input signal, or if switch S4 is open. Capacitor C115 and resistor R116 function as an integrator to provide noise immunity. Assuming that switch S4 is closed, the normally high potential at terminal 14 (in the disarmed state) holds capacitor C115 and C120 charged, capacitor C115 being returned directly to ground, and capacitor C120 being returned to ground through resistor R119.

Since diode D22 is connected to the B+ supply, the B+ potential is extended through the diode and resistor R117 to capacitor C118. The capacitor is normally discharged because both ends of the capacitor are returned to the B+ potential.

Each of chips IC14 and IC15 is a 555 timer. If pin 2 of a 555 timer goes below one-third of the supply voltage, the output at pin 3 goes high and remains high. If pin 6 goes above two-thirds of the supply voltage, output pin 3 goes low and remains there. Both timers are used in the circuit of FIG. 12 as comparator-inverters. Initially, pins 2 and 6 of chip IC14 are at the B+ potential so that output pin 3 is low. Ground potential is extended through resistor R118 to the base of transistor Q8 and the transistor remains off. Relay K4 thus remains de-energized. Input pins 2 and 6 of chip IC15 are returned through resistor R119 to ground, and thus output pin 3 of chip IC15 is high. But because the upper end of the coil of relay K5 is also connected to a high potential (the B+ supply less the drop across diode D22), relay K5 also remains de-energized.

When the system is armed, the potential at terminal 14 falls abruptly to ground. Capacitor C115 starts to discharge through resistor R116. As capacitor C115 discharges, the positive terminal of capacitor C118 falls in potential. As soon as pins 2 and 6 of chip IC14 drop below one-third of the supply voltage (4 volts), the output at pin 3 goes high and turns on transistor Q8 through resistor R118. Relay K4 energizes and causes the door locks to lock.

Although the positive terminal of capacitor C118 first goes low, the capacitor recharges through resistor R117. When the voltage at pins 2 and 6 rises to about 8 volts, output pin 3 goes low once again to turn off relay K4. Resistor R117 is much larger in magnitude than resistor R116. Thus capacitor C115 discharges rapidly and forces the positive terminal of capacitor C118 to go below 4 volts in potential before the capacitor can appreciably recharge from the smaller-magnitude current which flows through resistor R117. Pin 3 of chip IC14 goes high and remains high for approximately 0.3 second, a time sufficient for the door locks to lock as a result of the operation of relay K4.

It should be noted that upon arming of the system, as capacitor C115 discharges through resistor R116, a negative step is transmitted through capacitor C120 to pins 2 and 6 of chip IC15. But since these pins are initially grounded and output pin 3 is high, there is no change in the state of this chip.

When the system is disarmed, the voltage at terminal 14 rises abruptly to 12 volts. Capacitor C115 charges to its quiescent level, and capacitor C118 discharges (until there is no net voltage across it) preparatory to the next overall cycle of operation. A positive step is transmitted through capacitor C118 to pins 2 and 6 of chip IC14, but there is no change in the chip state since output pin 3 is already low. As capacitor C115 charges, the negative terminal of capacitor C120 rises toward 12 volts. It is clamped, however, at slightly above 8 volts by diode D24. But as soon as pins 2 and 6 of chip IC15 rise to 8 volts, the output of chip IC15 goes low. At this time the full B+ potential appears across the coil of relay K5 and it energizes. Capacitor C120 then charges through resistor R119. When the negative terminal of the capacitor falls below 4 volts (on its way to ground potential), the output of chip IC15 goes high once again to control de-energization of relay K5. Because resistor R119 is much greater in magnitude than resistor R116, capacitor C115 charges faster than capacitor C120; in this way, as in the case of capacitor C118, there is a momentary change in the potential of the capacitor terminal which is connected to inputs of the respective timer chip. In the case of capacitor C120, pins 2 and 6 rise above 8 volts and then remain above 4 volts for about 0.25 second, this being the duration of the operation of relay K5.

The function of capacitor C119 is to hold chip IC14 off (that is, pin 3 low) until circuit voltages stabilize when power is first applied to the system. Chip IC14 applies an 8-volt potential at "control voltage" pin 5, but initially capacitor C119 has no potential across it. The low potential applied to pin 4 of chip IC14 holds the output low until capacitor C115 charges. Diode D24 also serves to prevent pins 2 and 6 of chip IC15 from reaching 8 volts during this stabilizing period as capacitor C120 charges, since the potential at pins 2 and 6 cannot exceed the potential across capacitor C119 by more than the drop across diode D24; this insures that when power is first applied to the system pin 3 of chip IC15 remains high to hold relay K5 de-energized.

The circuit of FIG. 13, when added to that of FIGS. 7-9, stops flashing of the lights in the disarmed state after they have flashed for approximately 4 minutes. The circuit also improves another aspect of the overall logic operation, as will be described below.

There are several connections between the circuit of FIG. 13 and the logic circuit of FIGS. 7-9. The four connections on the left of FIG. 13 are made to the indicated pins of the respective chips. Referring to FIGS. 7 and 8, it will be noted that the output, pin 3, of gate IC1B (FIG. 7) is connected to an input, pin 8, of gate IC4A (FIG. 8). When the circuit of FIG. 13 is used, this direct connection is broken and resistor R125 is substituted in its stead, pin 8 of gate IC4A also being extended to the anode of diode D26. The anode of diode D27 is connected to the positive terminal of capacitor C87 (FIG. 8). Also as indicated on FIG. 13, resistor R80 is deleted from FIG. 8, that is, the positive terminal of capacitor C87 is no longer connected to the output of chip IC2D.

It will be recalled that when the system is armed, capacitor C87 on FIG. 8 charges to approximately the B+ potential. When an alarm condition is sensed, the horn beeps for approximately 45 seconds until capacitor C87 discharges to the point at which comparator IC2C switches state. But if an intrusion is sensed before capacitor C87 has fully charged, the horn will actually beep for less than 45 seconds. If the alarm condition still exists, the cycle will re-initiate itself so from a practical standpoint this is not a serious problem. However, when demonstrating the system to a user, what is usually done is to arm the system and then to open a door or bang on the car. The momentary "alarm condition" may then result in only a few beeps of the horn, perhaps leaving the user unconvinced that in actual practice the system is capable of scaring off a thief.

The circuit of FIG. 13 insures that whenever the alarm is triggered, the horn beeps twenty-four times—even if capacitor C87 is not fully charged. Capacitor C87 no longer controls the duration of the alarm beeping. The only function of the capacitor when the circuit of FIG. 13 is added to that of FIGS. 7–9 is to provide an arming delay so that the alarm will not actually be triggered by the horn beeps which verify that the system has been armed. The circuit of FIG. 13 performs two functions: (1) it counts twenty-four horn beeps (which take approximately one minute) whenever an alarm condition has been sensed and then causes the horn to stop beeping, horn-beeping resuming only if the alarm condition still exists, and (2) it counts 119 light flashes (which take approximately four minutes) following disarming of the system, after which the lights turn off and stay off.

When power is first applied to the system, or whenever switch S2 (FIG. 7) is closed, a short positive pulse appears at pin 11 of chip IC5A. The output of gate IC16A on FIG. 13 goes low, and the output of gate IC16B goes high. The positive pulse at the output of this gate is applied to pins 7 and 15 of chip IC17. The chip itself is a dual up-counter, and when the two reset inputs (pins 7 and 15) are pulsed, the two four-bit binary counters contained in the chip are reset. The chip is configured so that it functions as a single 8-bit counter, by connecting pin 6 (the output of the first counter) to pin 9 (the input of the second).

When the system is first armed, it will be recalled that the horn is beeped twice. The second beep is controlled by a short positive pulse which appears at the output, pin 4, of gate IC4D (FIG. 8). The output of this gate is extended on FIG. 13 to one input of gate IC16A and thus resets the 8-bit counter (chip IC17) in the event the count is not zero as a result of a previous counting cycle.

The clock input (CL1) of the 8-bit counter is connected to pin 4 of chip IC5C. Pin 4 is the ouput pin of the gate (FIG. 9), and it will be recalled that the output of the gate goes high whenever the lights are flashed—not only during the alarm sequence but also during verification flashing. Thus a single connection may be utilized to count both types of flashing events, although as will be described below the final counts are different. (It will be recalled that the lights also flash once when the system is armed, and thus the counter actually counts one flash as soon as the system is armed, long before an intrusion is sensed. This would ordinarily result in the system counting only 23 flashes, rather than 24, before terminating the alarm, because the alarm—horn beeping and light flashing—terminates when the counter reaches a count of 24. Not that it really matters, but the "problem" is avoided by utilizing the second arming horn beep as a reset signal for the counter; the second beep which results from a pulse at pin 4 of gate IC4D occurs after the lights have already flashed. Thus the counter is reset to zero after first counting a single flash, so that a full 24 beeps are guaranteed if alarm beeping is required.)

If an alarm condition is now sensed, the output, pin 14, of comparator IC2B (FIG. 8) goes high. This high potential, as described above, controls the horn beeping and the flashing of the lights. The high potential is extended through capacitor C121 on FIG. 13, but has no effect on the circuit because the lower input of gate IC16B is normally high since it is returned through resistors R121 and R120 to the B+ supply. All that happens is that each positive pulse at the output of gate IC5C advances the count in chip IC17. At the beginning of the twenty-fourth beep, the Q2 output (pin 12) of the second counter stage goes high. (This stage is the sixth stage of the overall counter, and its output goes high at a count of 24.) The outputs of inverters IC16E/F go low and thus cause diode D27 to be forward biased. This results in capacitor C87 discharging, in effect terminating the alarm sequence; when the capacitor voltage drops low enough, chip IC2C changes state. The sequence is as described above, and the only difference is the mechanism for discharging capacitor C87 to control the timing of the alarm sequence. (Because the capacitor discharges rapidly, the twenty-fourth beep actually terminates prematurely so that it is somewhat shorter than the rest.)

The gates in chip IC16 are connected in parallel pairs; the chip is a low-power device and to sink the necessary current, parallel pairs are required.

The alarm circuit resets when capacitor C87 discharges, and the output of comparator IC2B goes low. The negative step is differentiated by capacitor C121 and resistor R120, and a negative pulse is extended through resistor R121 to an input of gate IC16B. The output of the gate goes high to reset the counter. Capacitor C87 now charges through resistor R124 since the counter is reset and diode D27 is reverse biased. If there is another alarm input or even if the same alarm input is applied continuously, the alarm is triggered once again and the same cycle ensues.

When the system is disarmed, a short positive pulse appears at output pin 4 of gate IC4D. As described above, this pulse results in resetting the counter to zero. As the flashing oscillator starts to operate, pin 4 of gate IC5C pulses and the count is advanced as before. At the beginning of the twenty-fourth count or flash, pin 12 of chip IC17 goes high. This has no effect on the charge across capacitor C87, however, because the system is now disarmed and capacitor C87 has already been discharged to one-half the supply voltage by resistors R78 and R79, and diode D8, as described above. Diode D27 is thus turned off, and consequently there is no effect on capacitor C87.

At the beginning of the 120th flash, the Q4 output at pin 14 of chip IC17 goes high, causing the outputs of inverters IC16C/D to go low. Current flows from the output of gate IC1B, through resistor R125 and diode D26, into the inverters. Because the anode of the diode is connected to an input of gate IC4A (FIG. 8), and the anode is held slightly above ground potential, the output of the gate goes high to reset flip-flop IC3B. The resetting of this flip-flop causes the lights to stop flashing. This reset sequence is so fast that relay K2 (FIG. 9) does not even operate before the flip-flop resets. That is why there are only 119 flashes even though the counter counts to 120. The count remains at 120, and the counter is reset only when the system is next armed as described above.

If the lights are flashing when the operator enters the vehicle and turns on the ignition, output pin 3 of gate IC1B (FIG. 7) goes low, as described above. The low potential is extended through resistor R125 on FIG. 13 to pin 8 of gate IC4A, and this immediately resets flip-flop IC3B and stops the light flashing. Resistor R125 and diode D26 function as an OR gate, a low potential being extended through either to pin 8 of gate IC4A to stop the flashing. Thus the cessation of flashing can be controlled either manually by the operator by turning on the ignition, or automatically with the counting of 120 flashes (of which only 119 are actually seen).

The values of the circuit components in the illustrative embodiment of the invention are as follows:

| Transmitter (FIG. 1) (ohms, picofarads and nanohenrys, except as noted) | | | |
|---|---|---|---|
| R1 | 470 | C8 | 1000 |
| R2 | 8.2M | C9 | 1.7–6.0 |
| R3 | (test) | C11 | 3.3 |
| R4 | 68 | C12 | 4.7 |
| R5 | 4.7K | C13 | 47 |
| R6 | 33K | C14 | 1000 |
| R7 | (test) | C15 | 1000 |
| C1 | .33 μF | L1 | 70 |
| C2 | (test) | L2 | 41 |
| C3 | 2.2 μF | L3 | 10 |
| C4 | 1000 | Q1 | MPS H-10 |
| C5 | .33 μF | U1 | TMX 2141 |
| C6 | 1000 | U2 | 78L26 AWC |
| C7 | 1000 | | |

| Buffer Amplifier (FIG. 2) (ohms, picofarads and nanohenrys) | | | |
|---|---|---|---|
| R8 | 110 | C23 | 6.8 |
| R9 | 2.2K | L5 | 105 |
| C20 | 2.2 | L6 | 58 |
| C21 | 1000 | L7 | 73 |
| C22 | 6.8 | Q2 | J310 |

| Receiver (FIGS. 3–5) (ohms, picofarads and nanohenrys, except as noted) | | | |
|---|---|---|---|
| R11 | 10 | C31 | 1000 |
| R12 | 4.7K | C32 | 1.3–5.4 |
| R13 | 2.2K | C33 | 1000 |
| R14 | 2.2K | C34 | 1.5 |
| R15 | 10K | C35 | 10 |
| R16 | 10K | C36 | 470 |
| R17 | 1M | C37 | .01 μF |
| R18 | 100K | C38 | 33 μF |
| R19 | 470 | C39 | .01 μF |
| R20 | 2.2K | C40 | .33 μF, 5% polycarbonate |
| R22 | 150 | C41 | .33 μF, 5% polycarbonate |
| R23 | 15K | C42 | .33 μF, 5% polycarbonate |
| R24 | 6.2M | C43 | 33 μF |
| R25 | 15K | C44 | 1000 |
| R26 | 1M | C45 | .33 μF, 5% polycarbonate |
| R27 | 1M | C46 | .33 μF, 5% polycarbonate |
| R28 | 10K | C47 | 150 |
| R29 | 1K | C48 | 68 |
| R30 | 1K | C49 | .01 μF |
| R31 | 1M | C50 | 2.2 μF |
| R41 | 27K | C51 | 0.1 μF, 5% polycarbonate |
| R42 | 25K | C52 | 1000 |
| R43 | RN55D 191K | C53 | 2.2 μF |
| R44 | 27K | C54 | 0.1 μF, 5% polycarbonate |
| R45 | RN55D 111K | C55 | 500 μF |
| R46 | 330K | C61 | .01 μf |
| R47 | 27K | C62 | .01 μf |
| R48 | 27K | C63 | .33 μf, 5% polycarbonate |
| R49 | 4.7K | C64 | .01 μf |

| Receiver (FIGS. 3–5) (ohms, picofarads and nanohenrys, except as noted) -continued | | | |
|---|---|---|---|
| C65 | .01 μf | CR6 | 1N4002 |
| C66 | .10 μf, 5% polycarbonate | CR10 | 1N4148 |
| L11 | 470 | CR11 | 1N4148 |
| L12 | 40 | Q3 | MPS-H10 |
| L13 | 470 | Q4 | 2N3903 |
| L14 | 470 | U3 | TMX2151 |
| CR1 | 1N4148 | U4 | MM74C221 |
| CR2 | 1N4148 | U5 | LM78L05ACZ |
| CR3 | 1N747A | U6 | 555 |
| CR4 | 1N4148 | U7 | 555 |
| CR5 | 1N4148 | IC6 | 4011B |
| | | IC7 | 4025B |

| Logic Circuit (FIGS. 7–9) (ohms, microfarads) | | | |
|---|---|---|---|
| R51 | 27K | R66 | 10K |
| R52 | 560K | R67 | 270 |
| R53 | 27K | R68 | 10K |
| R54 | 27K | R69 | 27K |
| R55 | 10K | R70 | 10K |
| R56 | 10K | R71 | 560K |
| R57 | 1K | R72 | 10K |
| R58 | 1K | R73 | 10K |
| R59 | 560K | R74 | 10K |
| R60 | 27K | R75 | 560K |
| R61 | 1K | R76 | 560K |
| R62 | 27K | R77 | 560K |
| R63 | 250K | R78 | 27K |
| R64 | 10K | R79 | 27K |
| R65 | 27K | R80 | 1.2M |
| R81 | 16K | C77 | .01 |
| R82 | 27K | C78 | .01 |
| R83 | 560K | C79 | .22 |
| R84 | 27K | C80 | 1.5 |
| R85 | 27K | C81 | 33 |
| R86 | 39K | C82 | .01 |
| R87 | 100K | C83 | 1.5 |
| R88 | 10K | C84 | .22 |
| R89 | 27K | C85 | .22 |
| R90 | 2.2K | C86 | .22 |
| R91 | 2.2K | C87 | 22 |
| R92 | 2.2K | C88 | 22 |
| R93 | 220/.5w | C89 | .01 |
| R94 | 220/.5w | C90 | .01 |
| R95 | 100K | C91 | 22 |
| R96 | 100K | D1–D12 | 1N4002 |
| R97 | 560K | Q5 | 2N4401 |
| R98 | 1K | Q6 | 2N4401 |
| C71 | 33 | Q7 | 2N4401 |
| C72 | .01 | IC1 | 4001B |
| C73 | .22 | IC2 | LM324 |
| C74 | 33 | IC3 | 4013B |
| C75 | .01 | IC4 | 4011B |
| C76 | 33 | IC5 | 4011B |

| Disturbance Warning Circuit (FIG. 10) (ohms, microfarads) | | | |
|---|---|---|---|
| R100 | 10K | C102 | .01 |
| R101 | 10K | C103 | .33 |
| R102 | 10K | C104 | .01 |
| R103 | 10K | D20 | 1N4002 |
| R104 | 1K | D21 | 1N4002 |
| R105 | 100K | IC8 | (¼) 4013B |
| R106 | 100K | IC9 | 555 |
| R107 | 2.2K | IC10 | (1/6) 4069 |
| C100 | .01 | IC11 | (¼) 4071 |
| C101 | .01 | | |

| Ignition-Controlled Horn Verification Circuit (FIG. 11) (ohms, microfarads) | | | |
| --- | --- | --- | --- |
| R110 | 1M | IC12 | 4001 |
| C110 | 2.2 | IC13 | (¼) 4071 |

| Door Lock Control Circuit (FIG. 12) (ohms, microfarads) | | | |
| --- | --- | --- | --- |
| R115 | 39K | C119 | 33 |
| R116 | 4.7K | C120 | 1.5 |
| R117 | 220K | D22 | 1N4002 |
| R118 | 1K | D23 | 1N4002 |
| R119 | 220K | D24 | 1N4002 |
| C115 | 1.5 | D25 | 1N4002 |
| C116 | .01 | Q8 | 2N4401 |
| C117 | 33 | IC14 | 555 |
| C118 | 1.5 | IC15 | 555 |

| Automatic Flashing Timeout Circuit (FIG. 13) (ohms, microfarads) | | | |
| --- | --- | --- | --- |
| R120 | 22K | C121 | .02 |
| R121 | 22K | D26 | 1N4002 |
| R122 | 22K | D27 | 1N4002 |
| R123 | 22K | IC16 | 4572 |
| R124 | 680K | IC17 | 4520 |
| R125 | 22K | | |

Although the invention has been described with reference to particular embodiments, it is to be understood that these embodiments are merely illustrative of the application of the principles of the invention. For example, the security system has application to all kinds of vehicles, not only automobiles. Thus it is to be understood that numerous modifications may be made in the illustrative embodiment of the invention and other arrangements may be devised without departing from the spirit and scope of the invention.

We claim:

1. A vehicle security system for a vehicle having an electrical system and an ignition system which includes an ignition switch comprising a receiver/logic unit mounted in the vehicle and connected to the electrical system thereof; and an associated transmitter unit adapted to be carried by an authorized operator and, when operated, to transmit a uniquely coded signal which is received and recognized by said receiver/logic unit; said receiver/logic unit including means for inhibiting the operation of the vehicle, means for enabling the operation of said inhibiting means responsive to a first receipt and recognition of said coded signal and for disabling the operation of said inhibiting means responsive to a second receipt and recognition of said coded signal, and means responsive to operation of said ignition switch for preventing the enabling of the operation of said inhibiting means while the ignition system of the vehicle is on.

2. A vehicle security system in accordance with claim 1 wherein said receiver/logic unit further includes means for verifying the enablement of said inhibiting means by controlling momentary flashing of at least one of the vehicle lights responsive to a first receipt and recognition of said coded signal.

3. A vehicle security system in accordance with claim 2 wherein said verifying means further includes means for controlling momentary beeping of the vehicle horn.

4. A vehicle security system in accordance with claim 3 wherein said receiver/logic unit further includes means enabled responsive to a first receipt and recognition of said coded signal for detecting an attempt to gain access to the vehicle prior to a second receipt and recognition of said coded signal, and in response thereto for controlling alarm beeping of said horn.

5. A vehicle security system in accordance with claim 4 wherein said detecting means includes means coupled to speaker means in the vehicle for sensing vibrations therein.

6. A vehicle security system in accordance with claim 5 wherein said speaker means includes a pair of speakers, and said detecting means includes means for mixing the outputs thereof to sense the average vibrations therein.

7. A vehicle security system in accordance with claim 5 wherein said receiver/logic unit further includes means for holding said detecting means disabled from operating for a predetermined time interval after a first receipt and recognition of said coded signal and until after said verifying means has stopped controlling the momentary beeping of said horn.

8. A vehicle security system in accordance with claim 4 wherein said receiver/logic unit further includes means for selectively disabling said momentary beeping of the automobile horn without disabling the alarm beeping of said horn in response to an unauthorized access attempt.

9. A vehicle security system in accordance with claim 8 wherein said selectively disabling means includes means operative in response to the ignition system of the vehicle being turned on and then turned off within a short predetermined time interval.

10. A vehicle security system in accordance with claim 8 wherein said receiver/logic unit further includes means for controlling the alarm beeping of said horn responsive to an access attempt for only a predetermined time period, another access attempt then resulting in another alarm beeping of said horn for a similar predetermined time period.

11. A vehicle security system in accordance with claim 2 wherein said receiver/logic unit further includes means for controlling locking of the vehicle door locks responsive to a first receipt and recognition of said coded signal.

12. A vehicle security system in accordance with claim 2 wherein said receiver/logic unit further includes means responsive to a second receipt and recognition of said coded signal while said inhibiting means is enabled for controlling the flashing of at least one of the vehicle lights.

13. A vehicle security system in accordance with claim 12 wherein said receiver/logic unit includes means for stopping the flashing of said at least one of the vehicle lights when the vehicle ignition system is turned on.

14. A vehicle security system in accordance with claim 13 wherein said receiver/logic unit further includes means for stopping the flashing of said at least one of the vehicle lights after it has flashed for a predetermined time interval.

15. A vehicle security system in accordance with claim 12 wherein said receiver/logic unit further includes means for stopping the flashing of said at least one of the vehicle lights after it has flashed for a predetermined time interval.

16. A vehicle security system in accordance with claim 12 wherein said receiver/logic unit further includes means for controlling unlocking of the vehicle door locks responsive to a second receipt and recognition of said coded signal.

17. A vehicle security system in accordance with claim 16 wherein said receiver/logic unit further includes means for controlling the momentary beeping of the vehicle horn responsive to a second receipt and recognition of said coded signal.

18. A vehicle security system in accordance with claim 17 wherein said receiver/logic unit further includes means enabled responsive to a first receipt and recognition of said coded signal for detecting an attempt to gain access to the vehicle prior to a second receipt and recognition of said coded signal, and in response thereto for controlling alarm beeping of said horn.

19. A vehicle security system in accordance with claim 18 wherein said receiver/logic unit further includes means for selectively disabling said momentray beeping of the vehicle horn without disabling the alarm beeping of said horn in response to an access attempt.

20. A vehicle security system in accordance with claim 19 wherein said selectively disabling means includes means operative in response to the ignition system of the vehicle being turned on and then turned off within a short predetermined time interval.

21. A vehicle security system in accordance with claim 19 wherein said receiver/logic unit further includes means for controlling a momentary warning beep of the vehicle horn responsive to the opening of a vehicle door following a second receipt and recognition of said coded signal if between the first and second receipts and recognitions of said coded signal an attempt was made to gain access to the vehicle.

22. A vehicle security system in accordance with claim 1 wherein said receiver/logic unit further includes means for verifying the enablement of said inhibiting means by providing a visual signal responsive to a first receipt and recognition of said coded signal.

23. A vehicle security system in accordance with claim 1 wherein said receiver/logic unit further includes means for verifying the enablement of said inhibiting means by providing an aural signal responsive to a first receipt and recognition of said coded signal.

24. A vehicle security system in accordance with claim 23 wherein said receiver/logic unit further includes means enabled responsive to a first receipt and recognition of said coded signal for detecting an attempt to gain access to the vehicle prior to a second receipt and recognition of said coded signal, and in response thereto for generating an alarm signal.

25. A vehicle security system in accordance with claim 24 wherein said receiver/logic unit further includes means for selectively disabling the provision of said aural verifying signal without disabling the generation of said alarm signal in response to an access attempt.

26. A vehicle security system in accordance with claim 1 wherein said receiver/logic unit further includes means enabled responsive to a first receipt and recognition of said coded signal for detecting an attempt to gain access to the vehicle prior to a second receipt and recognition of said coded signal, and in response thereto for generating an alarm signal.

27. A vehicle security system in accordance with claim 26 wherein said detecting means includes means coupled to speaker means in the vehicle for sensing vibrations therein.

28. A vehicle security system in accordance with claim 27 wherein said receiver/logic unit further includes means for providing an aural verifying signal responsive to a first receipt and recognition of said coded signal, and means for holding said detecting means disabled from operating for a predetermined time interval after the first receipt and recognition of said coded signal.

29. A vehicle security system in accordance with claim 26 wherein said receiver/logic unit further includes means for controlling the generation of an alarm signal responsive to an access attempt for only a predetermined time period, another access attempt then resulting in another generation of an alarm signal for a similar predetermined time period.

30. A vehicle security system in accordance with claim 1 wherein said receiver/logic unit further includes means operable in two distinct modes and means operative in response to the ignition system of the vehicle being turned on and then turned off within a short predetermined time interval for changing the mode of operation of said two-mode operable means.

31. A vehicle security system in accordance claim 1 wherein said receiver/logic unit further includes means for controlling locking of the vehicle door locks responsive to a first receipt and recognition of said coded signal.

32. A vehicle security system in accordance with claim 1 wherein said receiver/logic unit further includes means responsive to a second receipt and recognition of said coded signal while said inhibiting means is enabled for controlling the turning on of at least one light.

33. A vehicle security system in accordance with claim 32 wherein said receiver/logic unit includes means for turning off said at least one light when the vehicle ignition system is turned on.

34. A vehicle security system in accordance with claim 33 wherein said receiver/logic unit further includes means for turning off said at least one light after a predetermined time interval.

35. A vehicle security system in accordance with claim 32 wherein said receiver/logic unit further includes means for turning off said at least one light after a predetermined time interval.

36. A vehicle security system in accordance with claim 1 wherein said receiver/logic unit further includes means for controlling unlocking of the vehicle door locks responsive to a second receipt and recognition of said coded signal.

37. A vehicle security system in accordance with claim 1 wherein said receiver/logic unit further includes means for providing an aural verifying signal responsive to a second receipt and recognition of said coded signal.

38. A vehicle security system in accordance with claim 37 wherein said receiver/logic unit further includes means enabled responsive to a first receipt and recognition of said coded signal for detecting an attempt to gain access to the vehicle prior to a second receipt and recognition of said coded signal, and in response thereto for generating an alarm signal.

39. A vehicle security system in accordance with claim 38 wherein said receiver/logic unit further includes means for selectively disabling the provision of said aural verifying signal without disabling the generation of said alarm signal in response to an unauthorized access attempt.

40. A vehicle security system in accordance with claim 38 wherein said receiver/logic unit further includes means for providing an aural warning signal responsive to the opening of a vehicle door following a second receipt and recognition of said coded signal if between the first and second receipts and recognitions of said coded signal an attempt was made to gain access to the vehicle.

41. A vehicle security system in accordance with claim 1 wherein said receiver/logic unit further includes means enabled responsive to a first receipt and recognition of said coded signal for detecting an attempt to gain access to the vehicle prior to a second receipt and recognition of said coded signal, and in response thereto for generating an alarm signal, and means responsive to the opening of a vehicle door following a second receipt and recognition of said coded signal for providing a warning signal if between the first and second receipts and recognitions of said coded signal an attempt was made to gain access to the vehicle.

42. A vehicle security system in accordance with claim 1 wherein said receiver/logic unit further includes means responsive to the opening of a vehicle door following a second receipt and recognition of said coded signal for providing a warning indication if between the first and second receipts and recognitions of said coded signal an attempt was made to gain access to the vehicle.

43. A vehicle security system in accordance with claim 1 wherein said receiver/logic unit further includes means enabled responsive to a first receipt and recognition of said coded signal for detecting an attempt to gain access to the vehicle prior to a second receipt and recognition of said coded signal, and means for providing a warning signal to a returning operator if said detecting means has operated during his absence.

44. A vehicle security system for a vehicle having an electrical system and an ignition system which includes an ignition switch comprising a receiver/logic unit mounted in the vehicle and connected to the electrical system thereof; and an associated transmitter unit adapted to be carried by an authorized operator and, when operated, to transmit a uniquely coded signal which is received and recognized by said receiver/logic unit; said receiver/logic unit including anti-theft means, means for enabling the operation of said anti-theft means responsive to a first receipt and recognition of said coded signal and for disabling the operation of said anti-theft means responsive to a second receipt and recognition of said coded signal, and means responsive to operation of said ignition switch for preventing the enabling of the operation of said anti-theft means while the ignition system of the vehicle is on.

45. A vehicle security system in accordance with claim 44 wherein said receiver/logic unit further includes means for verifying the enablement of said anti-theft means by providing a visual signal responsive to a first receipt and recognition of said coded signal.

46. A vehicle security system in accordance with claim 44 wherein said receiver/logic unit further includes detecting means enabled responsive to a first receipt and recognition of said coded signal for detecting an attempt to gain access to the vehicle prior to a second receipt and recognition of said coded signal, and in response thereto for controlling the generation of an alarm signal.

47. A vehicle security system in accordance with claim 46 wherein said detecting means includes means coupled to speaker means in the vehicle for sensing vibrations therein.

48. A vehicle security system in accordance with claim 47 wherein said receiver/logic unit further includes means for holding said detecting means disabled from operating for a predetermined time interval after a first receipt and recognition of said coded signal.

49. A vehicle security system in accordance with claim 46 wherein said detecting means generates an alarm signal responsive to an access attempt for only a predetermined time period, another access attempt then resulting in another generation of an alarm signal for a similar predetermined time period.

50. A vehicle security system in accordance with claim 44 wherein said receiver/logic unit further includes means for controlling locking of the vehicle door locks responsive to a first receipt and recognition of said coded signal.

51. A vehicle security system in accordance with claim 44, wherein said receiver/logic unit further includes means responsive to a second receipt and recognition of said coded signal while said anti-theft means is enabled for controlling the turning on of at least one light.

52. A vehicle security system in accordance with claim 51 wherein said receiver/logic unit further includes means for turning off said at least one light after a predetermined time interval.

53. A vehicle security system in accordance with claim 44 wherein said receiver/logic unit further includes means for controlling unlocking of the vehicle door locks responsive to a second receipt and recognition of said coded signal.

54. A vehicle security system in accordance with claim 44 wherein said receiver/logic unit further includes means for providing an aural verify signal responsive to a receipt and recognition of said coded signal.

55. A vehicle security system in accordance with claim 54 wherein said receiver/logic unit further includes detecting means enabled responsive to a first receipt and recognition of said coded signal for detecting an attempt to gain access to the vehicle prior to a second receipt and recognition of said coded signal, and in response thereto for generating an alarm signal.

56. A vehicle security system in accordance with claim 55 wherein said receiver/logic unit further includes means for selectively disabling the provision of said aural signal without disabling the generation of said alarm signal in response to an access attempt.

57. A vehicle security system in accordance with claim 56 wherein said selectively disabling means includes means operative in response to the ignition system of the vehicle being turned on and then turned off within a predetermined time interval.

58. A vehicle security system in accordance with claim 56 wherein said receiver/logic unit further includes means for providing an aural warning signal responsive to the opening of a vehicle door following a second receipt and recognition of said coded signal if between the first and second receipts and recognitions of said coded signal an attempt was made to gain access to the vehicle.

59. A vehicle security system in accordance with claim 49 wherein said receiver/logic unit further includes means for providing a warning signal responsive to the opening of a vehicle door following a second receipt and recognition of said coded signal if between the first and second receipts and recognitions of said coded signal an attempt was made to gain access to the vehicle.

60. A vehicle security system in accordance with claim 44 wherein said receiver/logic unit further includes means for verifying the enablement of said anti-theft means by providing an aural verifying signal responsive to a first receipt and recognition of said coded signal.

61. A vehicle security system in accordance with claim 60 wherein said receiver/logic unit further includes detecting means enabled responsive to a first receipt and recognition of said coded signal for detecting an attempt to gain unauthorized access to the vehicle prior to a second receipt and recognition of said coded signal, and in response thereto for generating an alarm signal.

62. A vehicle security system in accordance with claim 61 wherein said receiver/logic unit further includes means for selectively disabling the provision of said aural verifying signal without disabling the generation of said alarm signal in response to an access attempt.

63. A vehicle security system in accordance with claim 62 wherein said selectively disabling means includes means operative in response to the ignition system of the vehicle being turned on and then turned off within a predetermined time interval.

64. A vehicle security system in accordance with claim 44 wherein said receiver/logic unit further includes detecting means enabled responsive to a first receipt and recognition of said coded signal for detecting an attempt to gain access to the vehicle prior to a second receipt and recognition of said coded signal, and means for providing a warning signal to a returning operator if said detecting means has operated during his absence.

65. A vehicle security system in accordance with claim 44 wherein said receiver/logic unit further includes means for controlling warning beeping of the automobile horn responsive to the opening of an automobile door following a second receipt and recognition of said coded signal if between the first and second receipts and recognitions of said coded signal an attempt was made to gain access to the vehicle.

66. A vehicle security system comprising a receiver/logic unit mounted in the vehicle and connected to the electrical system thereof; and an associated transmitter unit adapted to be carried by an authorized operator and, when operated, to transmit a uniquely coded signal which is received and recognized by said receiver/logic unit; said receiver/logic unit including means for inhibiting the operation of the vehicle, means for enabling the operation of said inhibiting means responsive to a first receipt and recognition of said coded signal and for disabling the operation of said inhibiting means responsive to a second receipt and recognition of said coded signal, and means enabled responsive to a first receipt and recognition of said coded signal for detecting an attempt to gain access to the vehicle prior to a second receipt and recognition of said coded signal, and in response thereto for generating an alarm signal; said detecting means including means coupled to a pair of speakers in the vehicle, and means for mixing the outputs thereof to sense the average vibrations therein.

67. A vehicle security system comprising a receiver/logic unit mounted in the vehicle and connected to the electrical system thereof; and an associated transmitter unit adapted to be carried by an authorized operator and, when operated, to transmit a uniquely coded signal which is received and recognized by said receiver/logic unit; said receiver/logic unit including anti-theft means, means for enabling the operation of said anti-theft means responsive to a first receipt and recognition of said coded signal and for disabling the operation of said anti-theft means responsive to a second receipt and recognition of said coded signal, means responsive to a second receipt and recognition of said coded signal while said anti-theft means is enabled for controlling the turning on of at least one light, and means for turning off said at least one light when the vehicle ignition system is turned on.

68. A vehicle security system in accordance with claim 67 wherein said receiver/logic unit further includes means for turning off said at least one light after a predetermined time interval.

69. A vehicle security system comprising a receiver/logic unit mounted in the vehicle connected to the electrical system thereof; and an associated transmitter unit adapted to be carried by an authorized operator and, when operated, to transmit a uniquely coded signal which is received and recognized by said receiver/logic unit; said receiver/logic unit including anti-theft means, means for enabling the operation of said anti-theft means responsive to a first receipt and recognition of said coded signal and for disabling the operation of said anti-theft means responsive to a second receipt and recognition of said coded signal, means operable in two distinct modes, and means operative in response to the ignition system of the vehicle being turned on and then turned off within a predetermined time interval for changing the mode of operation of said two-mode operable means.

70. A vehicle security system comprising a receiver/logic unit mounted in the vehicle and connected to the electrical system thereof; and an associated transmitter unit adapted to be carried by an authorized operator and, when operated, to transmit a uniquely coded signal which is received and recognized by said receiver/logic unit; said receiver/logic unit including means for inhibiting the operation of the vehicle, means for enabling the operation of said inhibiting means responsive to a first receipt and recognition of said coded signal and for disabling the operation of said inhibiting means responsive to a second receipt and recognition of said coded signal, means for providing an aural verifying signal responsive to a second receipt and recognition of said coded signal, means enabled responsive to a first receipt and recognition of said coded signal for detecting an attempt to gain access to the vehicle prior to a second receipt and recognition of said coded signal, and in response thereto for generating an alarm signal, and means for selectively disabling the provision of said aural verifying signal without disabling the generation of said alarm signal in response to an unauthorized access attempt.

71. A vehicle security system in accordance with claim 70 wherein said selectively disabling means includes means operative in response to the ignition system of the vehicle being turned on and then turned off within a short predetermined time interval.

72. A vehicle security system comprising a receiver/logic unit mounted in the vehicle and connected to the electrical system thereof; and an associated transmitter unit adapted to be carried by an authorized operator and, when operated, to transmit a uniquely coded signal which is received and recognized by said receiver/logic unit; said receiver/logic unit including means for inhibiting the operation of the vehicle, means for enabling the operation of said inhibiting means responsive to a first receipt and recognition of said coded signal and for disabling the operation of said inhibiting means responsive to a second receipt and recognition of said coded signal, means for verifying the enablement of said inhibiting means by providing an aural signal responsive to a first receipt and recognition of said coded signal, means enabled responsive to a first receipt and recognition of said coded signal for detecting an attempt to gain access to the vehicle prior to a second receipt and recognition of said coded signal, and in response thereto for generating an alarm signal, and means for selectively disabling the provision of said aural verifying signal without disabling the generation of said alarm signal in response to an access attempt.

73. A vehicle security system in accordance with claim 72 wherein said selectively disabling means includes means operative in response to the ignition system of the vehicle being turned on and then turned off within a short predetermined time interval.

74. A vehicle security system comprising a receiver/logic unit mounted in the vehicle and connected to the electrical system thereof; and an associated transmitter unit adapted to be carried by an authorized operator and, when operated, to transmit a uniquely coded signal which is received and recognized by said receiver/logic unit; said receiver/logic unit including anti-theft means, means for enabling the operation of said anti-theft means responsive to a first receipt and recognition of said coded signal and for disabling the operation of said anti-theft means responsive to a second receipt and recognition of said coded signal, and means for controlling warning beeping of the automobile horn responsive to the opening of an automobile door following a second receipt and recognition of said coded signal if between the first and second receipts and recognitions of said coded signal an attempt was made to gain access to the vehicle.

75. A vehicle security system comprising a receiver/logic unit mounted in the vehicle and connected to the electrical system thereof; and an associated transmitter unit adapted to be carried by an authorized operator and, when operated, to transmit a uniquely coded signal which is received and recognized by said receiver/logic unit; said receiver/logic unit including anti-theft means, means for enabling the operation of said anti-theft means responsive to a first receipt and recognition of said coded signal and for disabling the operation of said anti-theft means responsive to a second receipt and recognition of said coded signal, and detecting means enabled responsive to a first receipt and recognition of said coded signal for detecting an attempt to gain access to the vehicle prior to a second receipt and recognition of said coded signal, and in response thereto for controlling the generation of an alarm signal; said detecting means including means coupled to multiple speakers in the vehicle for mixing the outputs thereof to sense the average vibrations therein.

* * * * *